(12) United States Patent
Noda

(10) Patent No.: US 8,909,931 B2
(45) Date of Patent: Dec. 9, 2014

(54) SERVER AUTHENTICATION SYSTEM, SERVER AUTHENTICATION METHOD, AND PROGRAM FOR SERVER AUTHENTICATION

(75) Inventor: Jun Noda, Tokyo (JP)

(73) Assignee: NEC Corporation, Tokyo (JP)

( * ) Notice: Subject to any disclaimer, the term of this patent is extended or adjusted under 35 U.S.C. 154(b) by 359 days.

(21) Appl. No.: 12/919,454

(22) PCT Filed: Jan. 28, 2009

(86) PCT No.: PCT/JP2009/051378
§ 371 (c)(1), (2), (4) Date: Aug. 25, 2010

(87) PCT Pub. No.: WO2009/107442
PCT Pub. Date: Sep. 3, 2009

(65) Prior Publication Data
US 2011/0010547 A1 Jan. 13, 2011

(30) Foreign Application Priority Data
Feb. 29, 2008 (JP) .................. 2008-049093

(51) Int. Cl.
*H04L 9/32* (2006.01)
*H04L 29/06* (2006.01)
*G06F 21/44* (2013.01)
*H04L 9/08* (2006.01)

(52) U.S. Cl.
CPC .............. *H04L 63/08* (2013.01); *G06F 21/445* (2013.01); *H04L 9/3242* (2013.01); *H04L 9/321* (2013.01); *G06F 2221/2129* (2013.01); *H04L 9/0897* (2013.01)
USPC .......................................... 713/170; 713/168

(58) Field of Classification Search
USPC ............................ 713/168–170; 726/3, 4, 6, 7
See application file for complete search history.

(56) References Cited

U.S. PATENT DOCUMENTS

| 7,305,084 B2 * | 12/2007 | Hawkes et al. ............... 380/37 |
| 2007/0174614 A1 * | 7/2007 | Duane et al. ................. 713/168 |

(Continued)

FOREIGN PATENT DOCUMENTS

| JP | 2007034737 A | 2/2007 |
| JP | 2007089147 A | 4/2007 |

(Continued)

OTHER PUBLICATIONS

Ye et al. IEEE 2005—False Data in Sensor Networks.*

(Continued)

*Primary Examiner* — Jung Kim
*Assistant Examiner* — Tri Tran
(74) *Attorney, Agent, or Firm* — Sughrue Mion, PLLC

(57) ABSTRACT

In order to complete an authentication process in shorter time in a case where there is a large number of clients which concurrently authenticate a server, the server in a server authentication system includes an address key allocation means for generating an identifier to identify each of the clients by a combination of addresses on a plurality of address spaces and allocating address keys to the respective addresses configuring the generated identifier, and a message authentication code generation means for generating message authentication codes corresponding to a message by using the address keys allocated by the address key allocation means. Each of the clients includes a server authentication means for authenticating the server based on the message authentication codes generated by the message authentication code generation means.

16 Claims, 11 Drawing Sheets

(56) References Cited

U.S. PATENT DOCUMENTS

2008/0034213 A1* 2/2008 Boemker et al. ............. 713/176
2009/0132819 A1* 5/2009 Lu et al. ..................... 713/169

FOREIGN PATENT DOCUMENTS

| | | |
|---|---|---|
| JP | 2007234039 A | 9/2007 |
| WO | 2006131849 A | 12/2006 |

OTHER PUBLICATIONS

International Search Report for PCT/JP2009/051378 mailed May 12, 2009.

S. Sakata et al, "ZiBee Sensor Network", Shuwa System, Jul. 29. 2005. pp. 118.

FIPS Pub 113, Announcing the Standard for Computer Data Authentication, Federal Information Processing Standard Publication, May 30, 1985.

H. Krawczyk et al., "HMAC Keyed-Hashing for Message Authentication", Network working Group, RFC 2104, Feb. 1997.

T. Yao et al, "Reliable broadcast authentication in sensor networks", Information Processing Society Japan SIG Technical Report, 2005-DPS-122, 2005-CSEC-28, vol. 2005, No. 33, Mar. 23.2005, pp. 241-246.

T. Yao et al: "Sensor Network ni Okeru Koshinrai Broadcast Message Ninsho Gijutsu", OKI Technical Review, vol. 72, No. 4. Oct. 1, 2005, pp. 40-43.

J. Noda et al., "A Scalable Server Data Authentication Scheme for Sensor Networks", IEICE Technical Report, USN2008-11, vol. 108, No. 138, Jul. 10, 2008, pp. 1-6.

Jun Noda et al., "Development and Evaluation of the Key Management Scheme Using Some Attributes Associated with Sensors", Collected papers of Multimedia, Distributed, Cooperative, and Mobile (DICOMO2007) symposium, IPSJ symposium series, [CD-ROM], Japan, IPSJ, Jul. 4, 2007, vol. 2007, No. 1, p. 524-529. Concise English Explanation is provided in JP Office Action.

Japanese Office Action for JP Application No. 2010-500618 mailed on May 7, 2013 with English Translation.

* cited by examiner

IDENTIFIER OF CLIENT 200

(1-1, 2-q, 3-2)

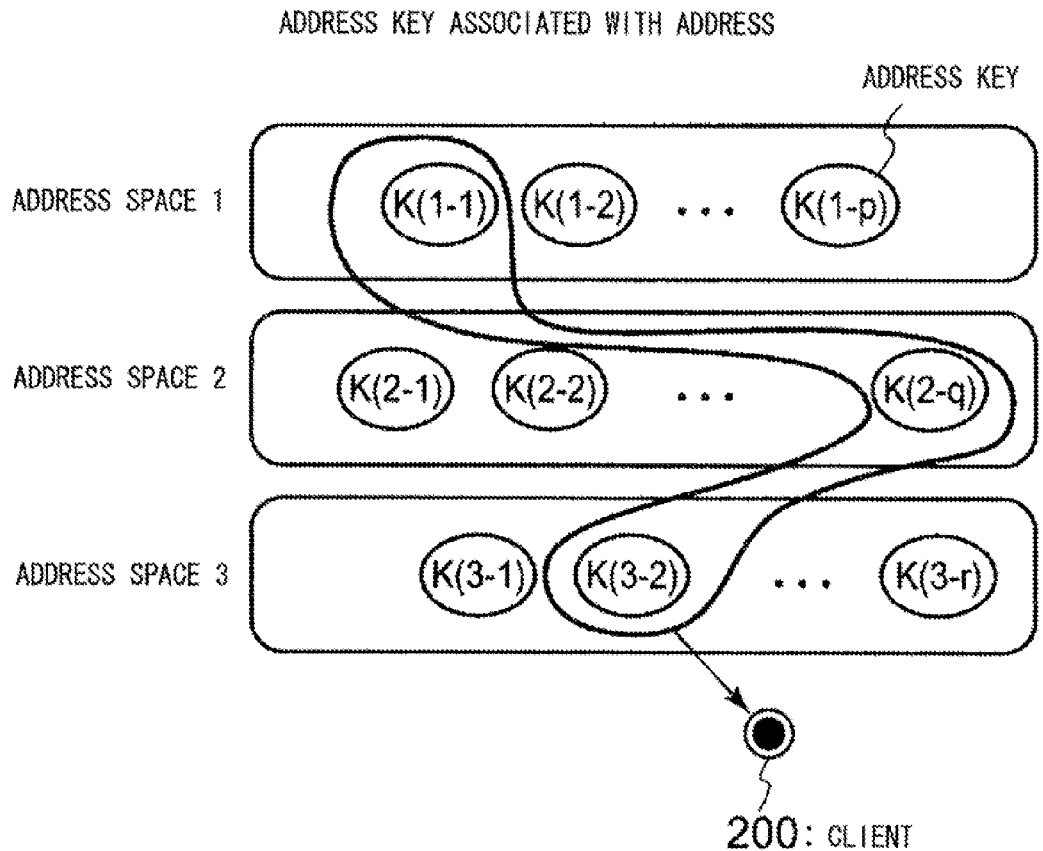

SERVER AUTHENTICATION SYSTEM, SERVER AUTHENTICATION METHOD, AND PROGRAM FOR SERVER AUTHENTICATION

This application is the National Phase of PCT/JP2009/051378, filed Jan. 28, 2009, which is based upon the claims the benefit of priority from Japanese patent application No. 2008-049093, filed on Feb. 29, 2008, the disclosure of which is incorporated herein in its entirely by reference.

TECHNICAL FIELD

The present invention relates to a server authentication system, a server authentication method, and a program for server authentication, where clients authenticate a server. Further, the present invention relates to a server and a client included in a server authentication system.

BACKGROUND ART

As with a sensor network, there is a system where a large number of clients, which are placed under various environments, collect information to be uploaded through a network to a server for information collection. When such a system is used, it is possible to recognize information of remote places through the network from the clients placed under the environments, and to improve the operational efficiency compared with a method where someone travels around every single place to manage the information.

For example, Patent Document 1 discloses an example of the sensor network. FIG. 16 is an explanatory diagram showing the example of the sensor network disclosed in Patent Document 1. As shown in FIG. 16, a sensor network 900 disclosed in Patent Document 1 includes a plurality of sensor devices (clients) 901 . . . which each have a radio communication function, and external applications (servers) 921, 922, 923 . . . .

There are various purposes to use the sensor network 900, and it can be used in every field such as crime prevention, disaster prevention, nursing care, energy saving, and wide-area measurement and tracing. For example, in the field of nursing care, it is possible to monitor heart rates, body temperatures, posture, motions of limbs, emergency, and the like by using the sensor devices 901. The sensor devices 901 themselves generally do not have advanced processing ability due to problems such as manufacturing costs and power consumption thereof.

The sensor network which has the above-mentioned configuration operates as follows. Namely, when data from a large number of clients widely placed under the environments is collected to the server in the sensor network, a path by radio communication to the server is established, and each client transmits information through the established radio communication path.

Further, when personal or corporate privacy information, confidential information, or the like is included in the information to be transmitted by the client, the client needs to confirm (authenticate) whether or not the destination server is a legitimate server before uploading the information. In this case, under environment where there is restriction in processing ability as with the client in the sensor network, it is difficult to implement a process in which public key encryption is used in order to execute an authentication process. Therefore, there is adopted a message authentication in which common key encryption or a hash function with a key is used.

Specifically, as disclosed in, e.g., Non-Patent Document 1, specific secret information (encryption key) is preliminarily and secretly stored between the server and each client on one to one basis. Then, information for authentication called a message authentication code is generated based on the encryption key preliminarily shared, and the message authentication code is added to a message to be transmitted. The message authentication code is the one which can be generated only by any one of the server and the client sharing the encryption key. The server and the client confirm coincidence of the generated information with each other, thereby authenticating a transmission source of the message. In this case, a message authentication code which is generated for a message "m" based on an encryption key "k" can be represented as an expression (1).

$$MAC(k, m) \tag{1}$$

As a specific method of configuring the message authentication code, e.g., Non-Patent Document 2 discloses a method of configuring the message authentication code by using the common key encryption. Further, e.g., Non-Patent Document 3 discloses a method of configuring the message authentication code by using the hash function with the key. Note that the method of configuring the message authentication code is not limited to these methods, and another configuring method which can be implemented on the client may be used.

For example, consider a case of configuring a sensor network in which a certain client uploads data in response to only an information request from a legitimate server. In this case, as represented in, e.g., an expression (2), the server generates a message authentication code for a message req_cmd which indicates a transmission request of data, by using the encryption key "k" which has been shared with each client. Then, as represented in the expression (2), the server transmits the generated message authentication code to each client together with the message req_cmd. In the expression (2), "||" means a concatenation of data.

$$req\_cmd \| MAC(k, req\_cmd) \tag{2}$$

The client, which shares the same encryption key with the server, confirms whether or not the message req_cmd is transmitted from the legitimate server. In this case, the client reconfigures the message authentication code with the encryption key owned by the client itself, and compares the reconfigured message authentication code with the incoming message authentication code, thereby determining whether or not the message authentication codes coincide with each other. Since it can be confirmed that the message is the one from the legitimate server when the message authentication codes coincide with each other, the client operates so as to upload data after the confirmation.

Note that the encryption key secretly stored at each of the server and the client is generally premised on being securely managed, by operation such as use of a device against tampering disclosed in, e.g., Patent Document 2 (that is, a device which makes it very difficult to illegally leak internal confidential information). Hereinafter, assume that the description as "secretly store" means to secretly store information under the premise that the illegal leak is very difficult by such operation.

[Patent Document 1]
Japanese Unexamined Patent Application Publication No. 2007-34737 (pages 5 to 6, FIG. 9)
[Patent Document 2]
Japanese Unexamined Patent Application Publication No. 2007-234039 (page 6)
[Non-Patent Document 1]
Shiro SAKATA, et al., "ZigBee Sensor Network", Shuwa System, 2005, p.p. 118

[Non-Patent Document 2]
FIPS PUB 113—Computer Data Authentication—the Federal Information Processing Standard publication that defines the Data Authentication Algorithm, [retrieved on 2007-12-25], Retrieved form the Internet <URL: www.itl.nist.gov/fipspubs/fip113.htm>
[Non-Patent Document 3]
RFC 2104 HMAC: Keyed-Hashing for Message Authentication, [retrieved on 2007-12-25], Retrieved form the Internet <URL: http://tools.ietf.org/html/rfc2104>

DISCLOSURE OF INVENTION

Technical Problems

However, there is a problem that processing time required for authentication increases in the method of using the encryption key which is secretly shared for each pair of server and client (that is, the system where the server generates the authentication information to be unicast to each client, by using the message authentication code). Namely, the server must generate and transmit the authentication information for each client, traffic in accordance with the number of clients is required, and communication time proportional to the traffic is required. Particularly, in a case of the sensor network, the number of clients (sensors) tends to be placed tends to increase for the sake of widening or miniaturizing collection areas, and thus the problem that the processing time required for authentication increases has emerged.

Accordingly, the present invention aims to provide a server authentication system, a server, a client, a server authentication method, and a program for server authentication, which can complete an authentication process in shorter time in a case where there is a large number of clients which concurrently authenticate a server.

Technical Solution

A server authentication system according to the present invention is the one in which clients authenticate a server. The server includes: an address key allocation means for generating an identifier to identify each of the clients by a combination of addresses on a plurality of address spaces, and allocating address keys to the respective addresses configuring the generated identifier; and a message authentication code generation means for generating message authentication codes corresponding to a message by using the address keys allocated by the address key allocation means. Each of the clients includes a server authentication means for authenticating the server based on the message authentication codes generated by the message authentication code generation means.

A server according to the present invention is the one included in a server authentication system in which clients authenticate the server. This server includes: an address key allocation means for generating an identifier to identify each of the clients by a combination of addresses on a plurality of address spaces, and allocating address keys to the respective addresses configuring the generated identifier; and a message authentication code generation means for generating message authentication codes corresponding to a message by using the address keys allocated by the address key allocation means.

A client according to the present invention is the one included in a server authentication system in which the client authenticates a server. This client includes a server authentication means for authenticating the server based on message authentication codes generated by the server. The server includes an address key allocation means for generating an identifier to identify the client by a combination of addresses on a plurality of address spaces and allocating address keys to the respective addresses configuring the generated identifier, and a message authentication code generation means for generating the message authentication codes corresponding to a message by using the address keys allocated by the address key allocation means.

A server authentication method according to the present invention is the one of authenticating a server by clients. This method includes: an address key allocation step of generating, by the server, an identifier to identify each of the clients by a combination of addresses on a plurality of address spaces, and allocating address keys to the respective addresses configuring the generated identifier; a message authentication code generation step of generating, by the server, message authentication codes corresponding to a message by using the allocated address keys; and a server authentication step of authenticating, by each client, the server based on the message authentication codes generated by the server.

A program for server authentication in which clients authenticate a server according to the present invention causes a computer to execute: an address key allocation process to generate an identifier to identify each of the clients by a combination of addresses on a plurality of address spaces, and allocate address keys to the respective addresses configuring the generated identifier; and a message authentication code generation process to generate message authentication codes corresponding to a message by using the allocated address keys.

Advantageous Effects

According to the present invention, the server does not generate the message authentication code per client, but generates the message authentication codes for a group of clients which have the same address on each address space in the identifier of each client. Accordingly, the server does not need to generate a message authentication code for each client, so that it is possible to reduce an amount of data transmission and processing time required for an authentication process.

BRIEF DESCRIPTION OF DRAWINGS

FIG. 4 is an explanatory diagram showing an example of address keys;
FIG. 5 is an explanatory diagram showing an example of address keys stored by a client.

EXPLANATION OF REFERENCE

Figure 1:
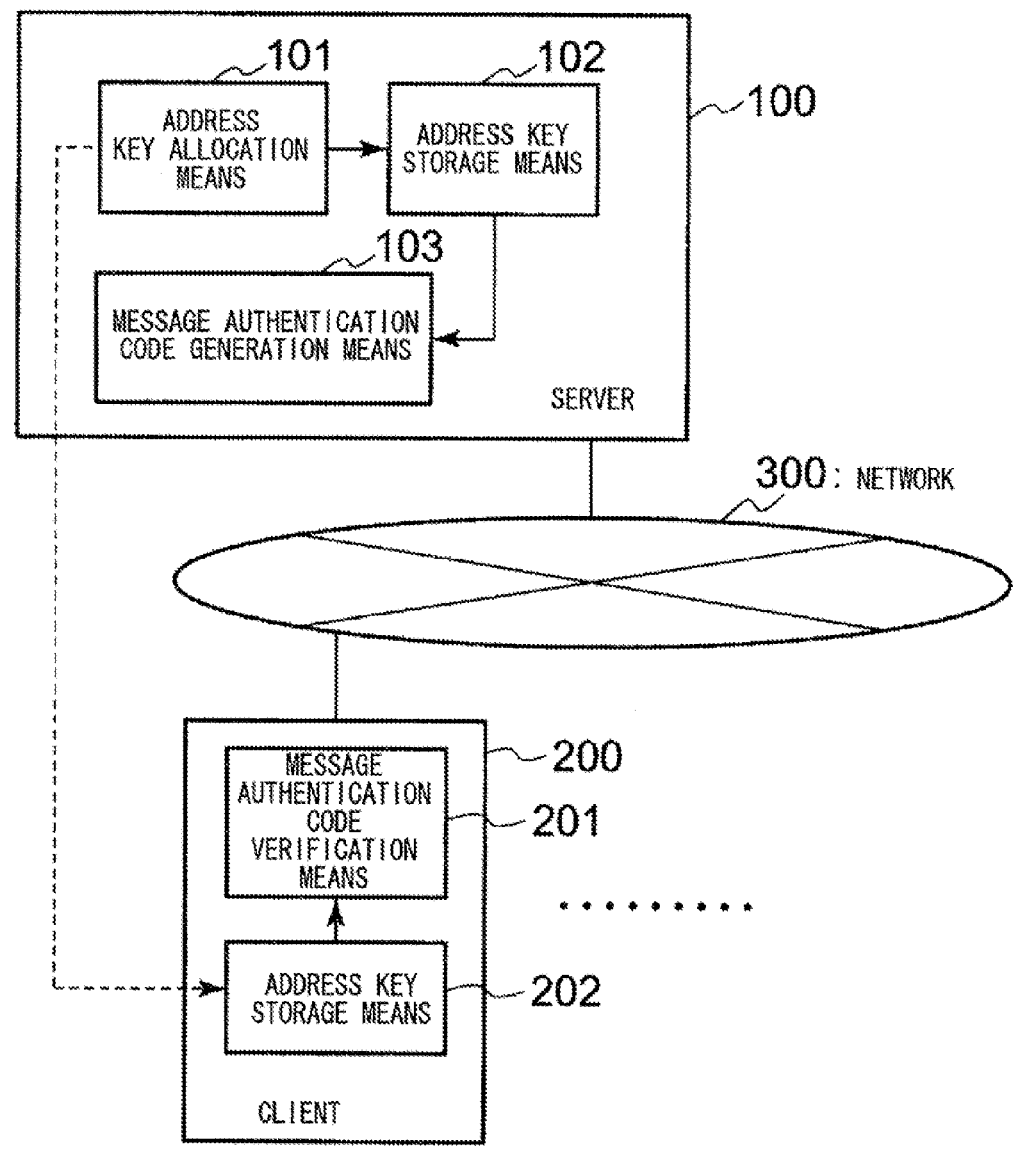
FIG. 1 is a block diagram showing an example of configuration of a server authentication system according to the present invention.

100 SERVER
101 ADDRESS KEY ALLOCATION MEANS
102 ADDRESS KEY STORAGE MEANS
103, 103A MESSAGE AUTHENTICATION CODE GENERATION MEANS
104 ADDRESS CHECKSUM KEY ALLOCATION MEANS
1041 HASHING OPERATION MEANS
105 ADDRESS CHECKSUM KEY STORAGE MEANS
200 CLIENT
201, 201A MESSAGE AUTHENTICATION CODE VERIFICATION MEANS
202 ADDRESS KEY STORAGE MEANS
203 ADDRESS CHECKSUM KEY STORAGE MEANS
300 NETWORK

BEST MODES FOR CARRYING OUT THE INVENTION

First Exemplary Embodiment

Hereinafter, a first exemplary embodiment according to the present invention will be described with reference to the drawings. The present invention relates to a server authentication system in which clients authenticate a server, and particularly to a server authentication system in which a large number of clients can authenticate a server with little traffic.

Firstly, a summary of the server authentication system according to the present invention is described. In a first configuration of the server authentication system according to the present invention, the server includes an address key allocation means, an address key storage means, and a message authentication code generation means. Further, each client includes an address key storage means and a message authentication code verification means.

The address key allocation means in the server creates a plurality of address spaces for an identifier of each client. The address key allocation means associates unique secret information (address keys) with the addresses on the address spaces in the identifier of each client, under a condition for uniquely identifying each client by a combination of positions (addresses) of each client in the address spaces. The address key allocation means operates so as to allocate to each client all of the address keys associated with the addresses on the address spaces in the identifier of each client, by using a secure transmission method which can be used online or offline.

The address key storage means in the server secretly stores the address keys allocated to the addresses on the address spaces in the identifiers of all clients, without disclosing the address keys to others.

Further, the message authentication code generation means calculates message authentication codes for an arbitrary message, by using the address keys stored by the address key storage means.

The address key storage means in each client secretly stores the address keys allocated by the address key allocation means in the server, without disclosing the address keys to others.

Further, the message authentication code verification means operates so as to verify the message authentication codes transmitted from the server through a network, by using the address keys stored by the address key storage means.

The above-mentioned configuration is adopted, and thus the server generates the message authentication codes for a group of clients of which addresses coincide with respect to each address space of the identifier by using the address keys corresponding to the addresses, and concurrently delivers the generated message authentication codes to the group of clients. Then, the client determines that the server is legitimate and completes authentication, when it determines that the message authentication codes from the server are correctly verified by exhaustively using all of the allocated address keys. The operation is performed in this way, so that it is possible to achieve the aim of the present invention.

Namely, in the server authentication system according to the present invention, only the client itself and the server are able to generate all of message authentication codes, which may be generated by using the address keys stored by the address key storage means in the client, considering the manner of providing the address keys. Accordingly, once the client verifies the message authentication codes upon their reception with the address keys held by the client itself and succeeds in the verification with all of the held address keys, the client can confirm that a transmitter of the message authentication codes is the legitimate server.

When all clients authenticate the server, the number of message authentication codes which are transmitted from the server into the network equals to the total number of addresses, and an amount of the transmission can be obtained by multiplying the size of the message authentication code by the total number of addresses. On the other hand, when the method of unicasting the message authentication code to each client is used, the number of message authentication codes which are transmitted from the server into the network equals to the total number of clients, and an amount of the transmission can be obtained by multiplying the size of the message authentication code by the total number of clients.

The total number of clients equals to a value obtained by multiplication of the numbers of addresses on the address spaces in the identifier of each client. The total number of addresses equals to a value obtained by addition of the numbers of addresses on the address spaces in the identifier of each client. Accordingly, a relation of "total number of addresses<total number of clients" is met, unless the total number of clients is significantly few. Therefore, according to the present invention, it is possible to reduce an amount of data transmitted from the server in a case where there is a large number of clients. In other words, it is possible to complete an authentication process in shorter time under a condition where performance of the network is the same.

Note that in the address key storage means included in the client, the internally stored address keys should be securely managed by using a device against tampering or the like.

Meanwhile, when an unexpected leak occurs, a malicious client can masquerade as the server by combining the leaked address key and its own address key. Configuration to which means for preventing this masquerade are further added will be described as a second configuration.

In the second configuration of the server authentication system according to the present invention, the server includes an address key allocation means, an address key storage means, an address checksum key allocation means, an address checksum key storage means, and a message authentication code generation means. Further, each client includes an address key storage means, an address checksum key storage means, and a message authentication code verification means.

The address key allocation means in the server creates a plurality of address spaces for an identifier of each client. The address key allocation means associates unique secret information (address keys) with the addresses on the address spaces in the identifier of each client, under a condition for uniquely identifying each client by a combination of positions (addresses) of each client in the address spaces. The address key allocation means operates so as to allocate to each client all of the address keys associated with the addresses on the address spaces in the identifier of each client, by using a secure transmission method which can be used online or offline.

The address key storage means in the server secretly stores the address keys allocated to the addresses on the address spaces in the identifiers of all clients, without disclosing the address keys to others.

The address checksum key allocation means in the server includes a hashing operation means. The address checksum key allocation means divides a bit space of a result of a hashing operation into subspaces, and associates unique address checksum keys with the subspaces. Then, the address checksum key allocation means hashes a concatenation of data which each indicate the address on each address space in the identifier of each client. The address checksum key allocation means operates so as to allocate the address checksum key associated with the subspace which includes the obtained hash to each client, by using the secure transmission method which can be used online or offline.

The address checksum key storage means in the server secretly stores address checksum keys allocated to subspaces each including a hash for a concatenation of data which each indicate the address on each address space in each of the identifiers of all clients, without disclosing the address checksum keys to others.

Further, the message authentication code generation means calculates message authentication codes for an arbitrary message, by using the address keys stored by the address key storage means and the address checksum key stored by the address checksum key storage means.

The address key storage means in each client secretly stores the address keys allocated by the server, without disclosing the address keys to others.

The address checksum key storage means in each client secretly stores the address checksum key allocated by the server, without disclosing the address checksum key to others.

Further, the message authentication code verification means operates so as to verify the message authentication codes transmitted from the server through a network, by using the address keys stored by the address key storage means and the address checksum key stored by the address checksum key storage means.

The above-mentioned configuration is adopted, and thus the server generates the message authentication codes for a group of clients of which addresses coincide with respect to each address space of the identifier by using the address keys corresponding to the addresses, and concurrently delivers the generated message authentication codes to the group of clients. Furthermore, the server generates the message authentication code by using the address checksum key associated with the subspace including the hash for the concatenation of the data which each indicate the addresses on the address spaces in the identifier of each client, and concurrently delivers the generated message authentication code to a group of clients which share the subspace including the hash to the concatenation of the data that indicate the addresses on the address spaces in the identifier of the client in common. Then, the client determines that the server is legitimate and completes authentication, when it determines that the message authentication codes from the server are correctly verified by exhaustively using the allocated address keys associated with the address spaces in its own identifier and the address checksum key. The operation is performed in this way, so that it is possible to achieve the aim of the present invention.

In the second configuration of the server authentication system according to the present invention, only the client itself and the server are able to generate all of message authentication codes, which may be generated by using the address keys stored by the address key storage means in the client and the address checksum key stored by the address checksum key storage means, considering the manner of providing the address keys and the address checksum key. Accordingly, once the client verifies the message authentication codes upon their reception with the address keys and the address checksum key held by the client itself and succeeds in the verification with all of the held address keys and the address checksum key, the client can confirm that a transmitter of the message authentication codes is the legitimate server.

In the second configuration of the server authentication system, the client performs the verification using the address checksum key in addition to the verification using the address keys, so that it is possible to prevent a malicious client from masquerading as the server in a case where the address key stored by the address key storage means in a certain client has been illegally leaked to the malicious client. This is because even when the malicious client combines the leaked address key and the address key held by the malicious client itself to masquerade as the server, a combination of the address checksum key and the address keys held by the malicious client does not always coincide with a legitimate combination of the address checksum key and the address keys stored by the server. When the division number of hashing operation spaces is "n", probability of the coincidence becomes "1/n". In this case, the number of message authentication codes transmitted from the server increases only by "n" compared to that in the first configuration of the server authentication system, and does not depend on the number of clients.

Next, the configuration of the server authentication system will be described. FIG. 1 is a block diagram showing an example of the configuration of the server authentication system according to the present invention. Note that the server authentication system shown in FIG. 1 is applied to use for the sensor network, for example.

As shown in FIG. 1, the server authentication system includes a server 100 operating by program control, and "N" (1<N) units of clients 200. Further, the server 100 and the clients 200 are connected through a network 300 such as Internet. While one of clients 200 is shown in FIG. 1, the server authentication system includes a plurality of (in this example, "N" units of) clients 200.

Further, as shown in FIG. 1, the server 100 includes an address key allocation means 101, an address key storage means 102, and a message authentication code generation means 103. The server 100 is specifically implemented by an information processing device such as a personal computer which operates in accordance with a program.

Furthermore, as shown in FIG. 1, each of the clients 200 includes a message authentication code verification means 201 and an address key storage means 202. Each of the clients 200 is specifically implemented by a sensor device on which various sensors such as a heart rate meter, a thermometer, an electric meter and a gas meter are mounted, and which includes at least a controller and a communicator for executing a process to transmit signals detected by the various sensors. Note that all of "N" units of clients 200 are similarly configured, and thus only the configuration of one unit of client 200 is shown in FIG. 1.

Each means shown in FIG. 1 operates as follows.

The address key allocation means 101 in the server 100 is specifically implemented by a CPU in the information processing device which operates in accordance with the program. The address key allocation means 101 includes a function of creating a plurality of address spaces in order to generate an identifier to identify each of the clients 200. Further, the address key allocation means 101 includes a function of uniquely identifying each of the clients 200, by a combination of positions (specifically addresses) of each of the clients 200 in the address spaces. Furthermore, the address key allocation means 101 includes a function of allocating secret information (specifically address keys) to the respective positions (addresses) of each of the clients 200 in the address spaces, based on a result of the identification of each of the clients 200.

Figures 2, 3:
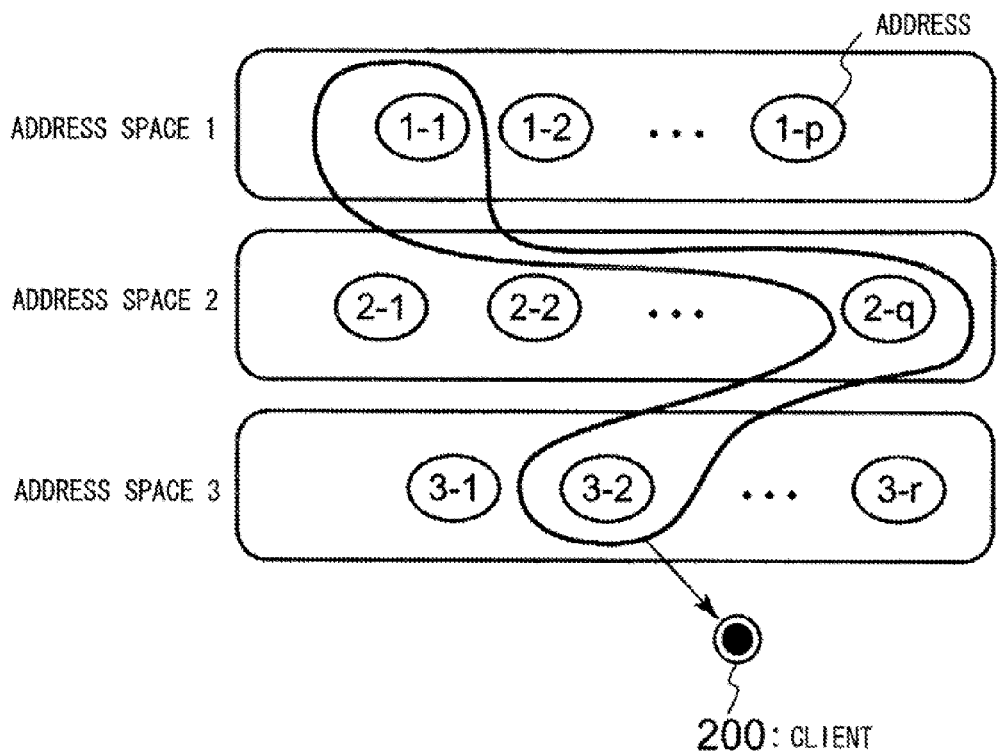
FIG. 2 is an explanatory diagram showing an appearance where a client is identified in three address spaces.
FIG. 3 is an explanatory diagram showing an example of an identifier of a client.

FIG. 2 is an explanatory diagram showing an appearance where the clients 200 are identified in three address spaces. Hereinafter, the description will be made based on the example shown in FIG. 2. Note that FIG. 2 shows a case of using three address spaces for the sake of simplifying the description. However, the number of address spaces created by the address key allocation means 101 is not limited to three. For example, four or more address spaces may be created.

In the example shown in FIG. 2, addresses on each address space are indicated within each ellipse shown in FIG. 2. For example, as shown in FIG. 2, an address space 1 includes addresses 1-1, 1-2, ..., 1-p, an address space 2 includes addresses 2-1, 2-2, ..., 2-q, and an address space 3 includes addresses 3-1, 3-2, ..., 3-r. Note that in FIG. 2, each of "p", "q" and "r" indicates the maximum number of addresses required for identifying all of the clients 200 in each address space.

In the example shown in FIG. 2, a combination of the addresses on the address spaces is made the identifier to identify each of the clients 200. For example, in a case of the client 200 shown in FIG. 2, (1-1, 2-q, 3-2) is made an identifier of the client 200 as shown in FIG. 3. In this way, under a condition for uniquely identifying each of the clients 200 by positions (addresses) of each of the clients 200 in the address spaces, pieces of unique secret information (specifically address keys) are associated with the addresses on the address spaces in the identifier of each of the clients 200.

In the example shown in FIG. 4, the address key allocation means 101 associates an address key K(X) with an address "X". Specifically, address keys K(1-1), K(1-2), ..., K(1-p) are associated respectively with the addresses 1-1, 1-2, ..., 1-p on the address space 1. Further, address keys K(2-1), K(2-2), ..., K(2-q) are associated respectively with the addresses 2-1, 2-2, ..., 2-q on the address space 2. Furthermore, address keys K(3-1), K(3-2), ..., K(3-r) are associated respectively with the addresses 3-1, 3-2, ..., 3-r on the address space 3.

Then, the address key allocation means 101 allocates to the clients 200 all of the address keys associated with the addresses on the address spaces configuring the identifiers of the clients 200, by using the secure transmission method which can be used online or offline. In this case, as shown in FIG. 5, the address key allocation means 101 allocates an address key ring including a total of three address keys (K(1-1), K(2-q), K(3-2)) to the client 200.

The address key storage means 102 in the server 100 is specifically implemented by a storage device such as a magnetic disk device or an optical disk device. The address key storage means 102 secretly stores the address keys allocated to the addresses on the address spaces configuring the identifiers of all of the clients 200, without disclosing the address keys to others. Note that for example, the address key storage means 102 stores the address keys in association with the respective addresses on the address spaces.

Note that in this exemplary embodiment, the address key storage means 102 securely manages the internally stored address keys by using the device against tampering, and prevents the address keys from being illegally used by using the well-known technology of, e.g., restricting access to information by an authentication means such as a password which only a legitimate administrator of the server knows.

The message authentication code generation means 103 in the server 100 is specifically implemented by the CPU and a network interface unit in the information processing device which operates in accordance with the program. The message authentication code generation means 103 includes a function of calculating message authentication codes for an arbitrary message, by using the address keys stored by the address key storage means 102.

The address key storage means 202 in each of the clients 200 is specifically implemented by a storage unit such as a memory or a magnetic disk device included in the sensor device. The address key storage means 202 secretly stores the address keys allocated by the address key allocation means 101 in the server 100, without disclosing the address keys to others.

Note that in this exemplary embodiment, the address key storage means 202 securely manages the internally stored address keys by using the device against tampering, and prevents the address keys from being illegally used by using the well-known technology of, e.g., restricting access to information by an authentication means such as a password which only a legitimate administrator of the client knows.

Further, in the example of the allocation of the address keys shown in FIG. 4, the key ring secretly stored by the client 200 includes a total of three address keys (K(1-1), K(2-q), K(3-2)) as shown in FIG. 5.

The message authentication code verification means 201 in each of the clients 200 is specifically implemented by the controller and the communicator included in the sensor device. The message authentication code verification means 201 includes a function of verifying the message authentication codes transmitted from the server 100 through the network 300, by using the address keys stored by the address key storage means 202.

Specifically, the message authentication code verification means 201 reconfigures the message authentication codes, by using the address keys stored by the address key storage means 202. Further, the message authentication code verification means 201 determines whether or not the message authentication codes received from the server 100 coincide with the reconfigured message authentication codes. Then, the message authentication code verification means 201 determines that the server 100 is legitimate, when the message authentication code verification means 201 determines that the message authentication codes coincide with each other by exhaustively using all of the address keys allocated to its own client 200.

Note that in this exemplary embodiment, a storage device (not shown) in the server 100 stores various programs for making a computer operates as the server 100. For example, the storage device in the server 100 stores a program for server authentication for causing a computer to execute an address key allocation process to generate an identifier to identify each client by a combination of addresses on a plurality of address spaces, and to allocate address keys to the respective addresses configuring the generated identifier, and a message authentication code generation process to generate message authentication codes corresponding to a message by using the allocated address keys.

Figure 6:
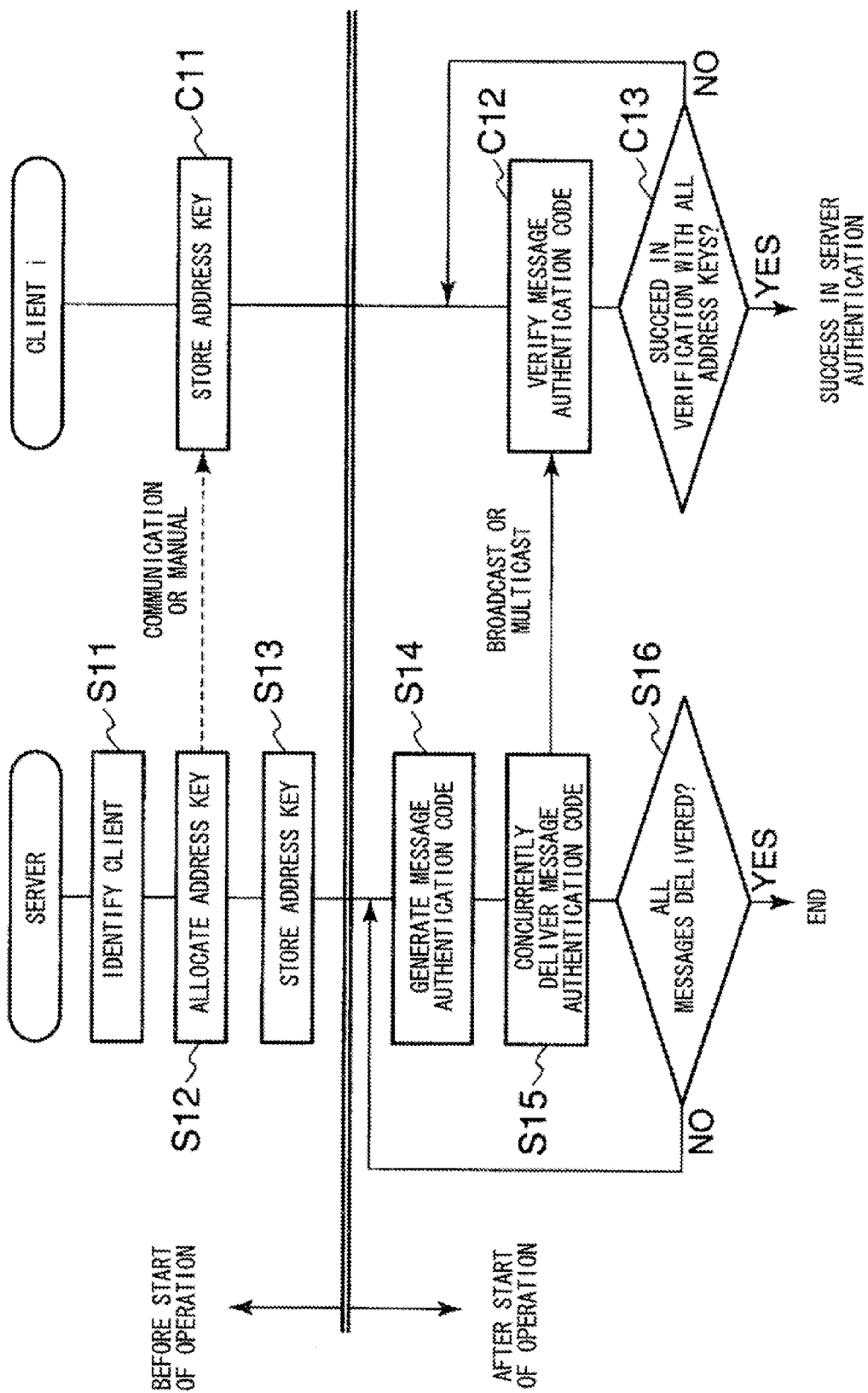
FIG. 6 is a flowchart showing an example of a process where a client authenticates that a server is legitimate.

Next, operation will be described. FIG. 6 is a flowchart showing an example of a process in which each of the clients 200 authenticates that the server 100 is legitimate. Firstly, operation before starting the operation of the server authentication system is described.

Firstly, the server 100 uniquely identifies each of "N" units of clients 200 by a combination of addresses on a plurality of address spaces, at a step prior to authentication of each of the clients 200 (in other words, before starting the operation of the system) (Step S11 shown in FIG. 6).

Next, the server 100 associates unique address keys with the addresses on the address spaces which configure the identifier of each of the clients 200. Then, the server 100 allocates the same address key to a group of clients 200 of which addresses coincide with respect to each address space of the identifier, by using a secure method (Step S12). In this case, as the method of allocating the address keys to each of the clients 200, for example, the address keys may be transmitted online through the existing secure communication path to which SSL, IPsec, or the like is applied. Alternatively, for example, the well-known means for which a legitimate administrator inputs the address keys obtained by a legitimate offline way to each of the clients 200 through an input means such as a keyboard may be used.

Next, a client "i" (1≤i≤N), to which the address keys have been allocated by the server 100, stores the allocated address keys (Step C11). Further, the server 100 stores all of the address keys allocated to the clients 200 (Step S13).

The processes at the above-mentioned steps are executed, thereby making it possible for each of the clients 200 to authenticate the server 100. In other words, it becomes possible to start the operation of the system.

After starting the operation of the system, there is arisen a situation that "N" units of clients 200 concurrently desire to authenticate that a transmission source of a message is the legitimate server 100, e.g., in a case where the server 100 concurrently delivers the message to "N" units of clients 200. In this case, the server 100 generates message authentication codes for the message to be concurrently delivered. Then, the server 100 concurrently delivers the generated message authentication codes together with the message.

Specifically, the server 100 generates message authentication codes for a group of clients of which addresses coincide with respect to each address space in the identifier of each of the clients 200, by using the address keys corresponding to the addresses (Step S14). Then, the server 100 concurrently delivers the generated message authentication codes to the group of clients (Step S15). In this case, as the method of concurrently delivering the message authentication codes, a method by use of multicast or broadcast can be applied.

The server 100 generates message authentication codes by using all of the address keys stored by the address key storage means 102, and repeatedly executes the processes at the steps S14 and S15 until completing concurrent deliveries of the message authentication codes (Step S16).

Specifically, in the example shown in FIG. 2, the server 100 concurrently delivers to a group of clients 200, which have an address a-b (1≤b≤the number ("p", "q", or "r") of addresses on an address space "a") on the address space "a" (1≤a≤3), a message authentication code generated by using an address key $K(a-b)$. For example, the server 100 makes a group of clients 200, which have the address 1-1 on the address space 1, share the address key $K(1-1)$, as shown in FIG. 4. Therefore, the server 100 concurrently delivers a message authentication code generated by using the address key $K(1-1)$.

For example, the client 200, which has the identifier shown in FIG. 3, belongs to three groups of the group of clients 200 which have the address 1-1, a group of clients 200 which have the address 2-q, and a group of clients 200 which have the address 3-2. Therefore, as a result, the client 200 receives message authentication codes represented in an expression (3) (and an arbitrary message req_cm).

$$MAC(K(1-1), req\_cmd)$$

$$MAC(K(2-q), req\_cmd)$$

$$MAC(K(3-2), req\_cmd) \qquad (3)$$

Next, the client "i", which has received the message authentication codes, verifies the message authentication codes by using the address keys stored by the client itself (in other words, the address keys stored by the address key storage means 202) (Step C12). Then, each of the clients 200 determines that the server 100 is legitimate, and completes the authentication, when each of the clients 200 determines that the message authentication codes from the server 100 can be correctly verified by exhaustively using all of the allocated address keys (Step C13).

In the example shown in FIG. 5, the address keys held by the client 200 are $K(1-1)$, $K(2-q)$, and $K(3-2)$. Accordingly, the client 200 can verify all of the message authentication codes which are received from the server 100 and represented in the expression (3), by using these three address keys. The client 200 determines it succeeds in authenticating the server 100, on the basis that all of the message authentication codes have been verified. Note that the client 200 determines that it fails in authenticating the server 100, when the message authentication codes have not been verified by any one of the plurality of allocated address keys.

As described above, according to this exemplary embodiment, the server 100 does not individually transmit the message authentication code to the clients 200, but transmits the message authentication code to the group of clients 200 which have the same address on each address space in the identifier of each of the clients 200. As configured in this way, it is possible to eliminate the need for the server 100 to generate and transmit the message authentication code for each client 200, so that it is possible to reduce an amount of data transmission and processing time required for the authentication process.

Further, according to this exemplary embodiment, the key is not shared for each pair of the server 100 and each of the clients 200, but the server 100 shares the key with the group of clients 200 which have the same address on each address space in the identifier of each of the clients 200. As configured in this way, it is possible to eliminate the need to manage the address key for each pair of the server 100 and each of the clients 200, so that it is possible to reduce the number of keys to be managed on the server 100 side.

Second Exemplary Embodiment

Figure 7:
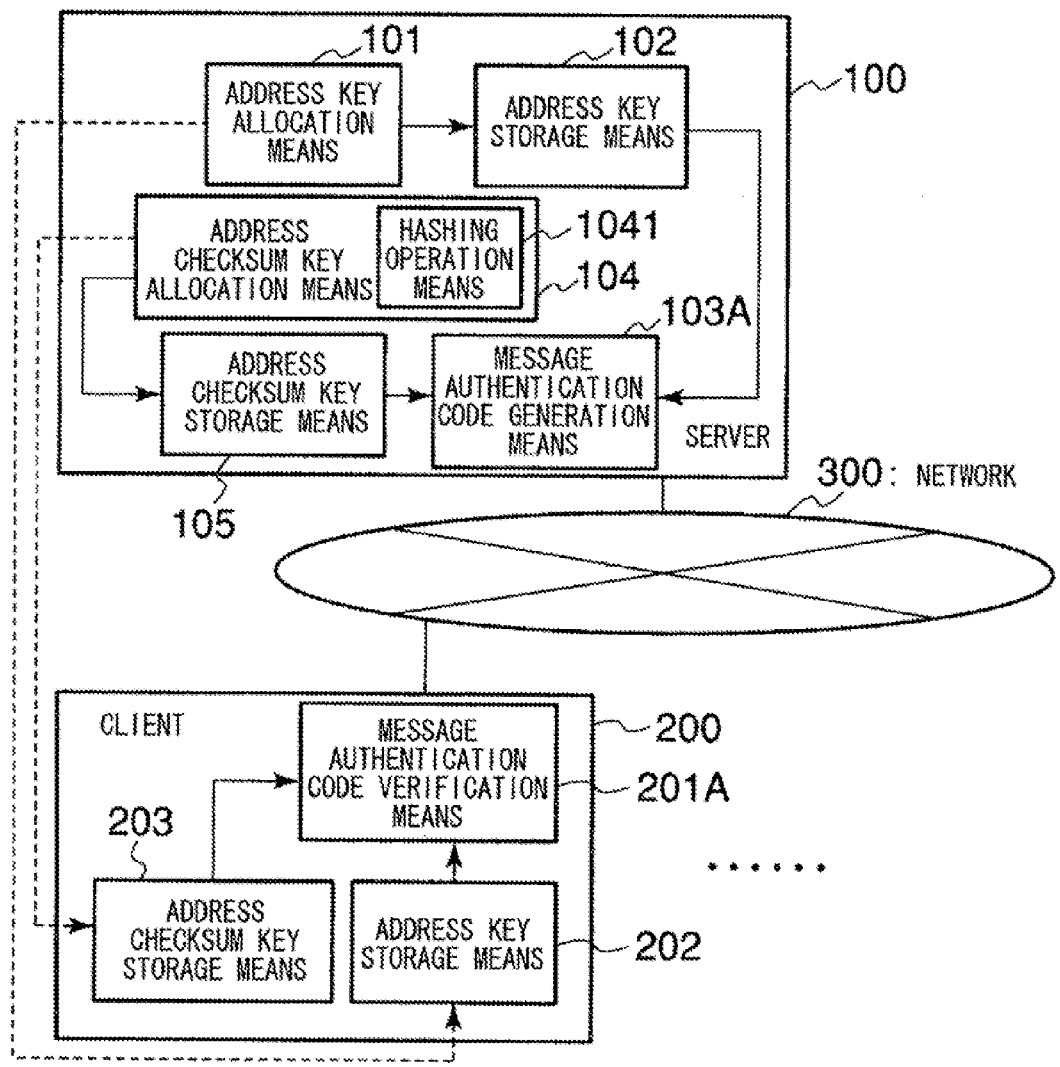
FIG. 7 is a block diagram showing another example of configuration of a server authentication system.

Next, a second exemplary embodiment according to the present invention will be described with reference to the drawings. FIG. 7 is a block diagram showing another example of configuration of the server authentication system. As shown in FIG. 7, this exemplary embodiment is different from the first exemplary embodiment in that the server 100 further includes an address checksum key allocation means 104 and an address checksum key storage means 105, in addition to the constituent elements shown in FIG. 1. Further, the address checksum key allocation means 104 includes a hashing operation means as the internal means. Further, this exemplary embodiment is different from that the first exemplary embodiment in that each of the clients 200 further includes an address checksum key storage means 203, in addition to the constituent elements shown in FIG. 1.

Further, in this exemplary embodiment, a function of a message authentication code generation means 103A is different from that of the message authentication code generation means 103 which has been described in the first exemplary embodiment. Furthermore, in this exemplary embodiment, a function of a message authentication code verification means 201A is different from that of the message authentication code verification means 201 which has been described in the first exemplary embodiment.

Each means shown in FIG. 7 operates as follows.

The address key allocation means 101 in the server 100 is specifically implemented by the CPU in the information processing device which operates in accordance with the program. The address key allocation means 101 includes the function of creating the plurality of address spaces in order to generate the identifier to identify each of the clients 200. Further, the address key allocation means 101 includes the function of uniquely identifying each of the clients 200, by the combination of positions (specifically addresses) of each of the clients 200 in the address spaces. Furthermore, the address key allocation means 101 includes the function of allocating the secret information (specifically address keys) to the respective positions (addresses) of each of the clients 200 in the address spaces, based on the result of the identification of each of the clients 200.

Note that as with the first exemplary embodiment, the address key allocation means 101 associates the unique secret information (address keys) with the addresses on the address spaces in the identifier of each of the clients 200, under the condition for uniquely identifying each of the clients 200 by the positions (addresses) of each of the clients 200 in the address spaces. Then, as with the first exemplary embodiment, the address key allocation means 101 allocates all of the address keys associated with the addresses on the address spaces configuring the identifier of each of the clients 200 to each of the clients 200, by using the secure transmission method which can be used online or offline.

The address checksum key allocation means 104 in the server 100 is specifically implemented by the CPU in the information processing device which operates in accordance with the program. Further, the address checksum key allocation means 104 includes a hashing operation means 1041 which performs a hashing operation.

The address checksum key allocation means 104 includes a function of dividing a bit space of a result of the hashing operation by the hashing operation means 1041 into subspaces, and associating unique secret information (specifically, address checksum keys) with the subspaces. Further, the address checksum key allocation means 104 includes a function of hashing a concatenation of data which each indicate the address on each address space in the identifier of each of the clients 200, after associating the secret information. Furthermore, the address checksum key allocation means 104 includes a function of allocating the address checksum key associated with the subspace including the obtained hash, by using the secure transmission method which can be used online or offline.

Figure 8:
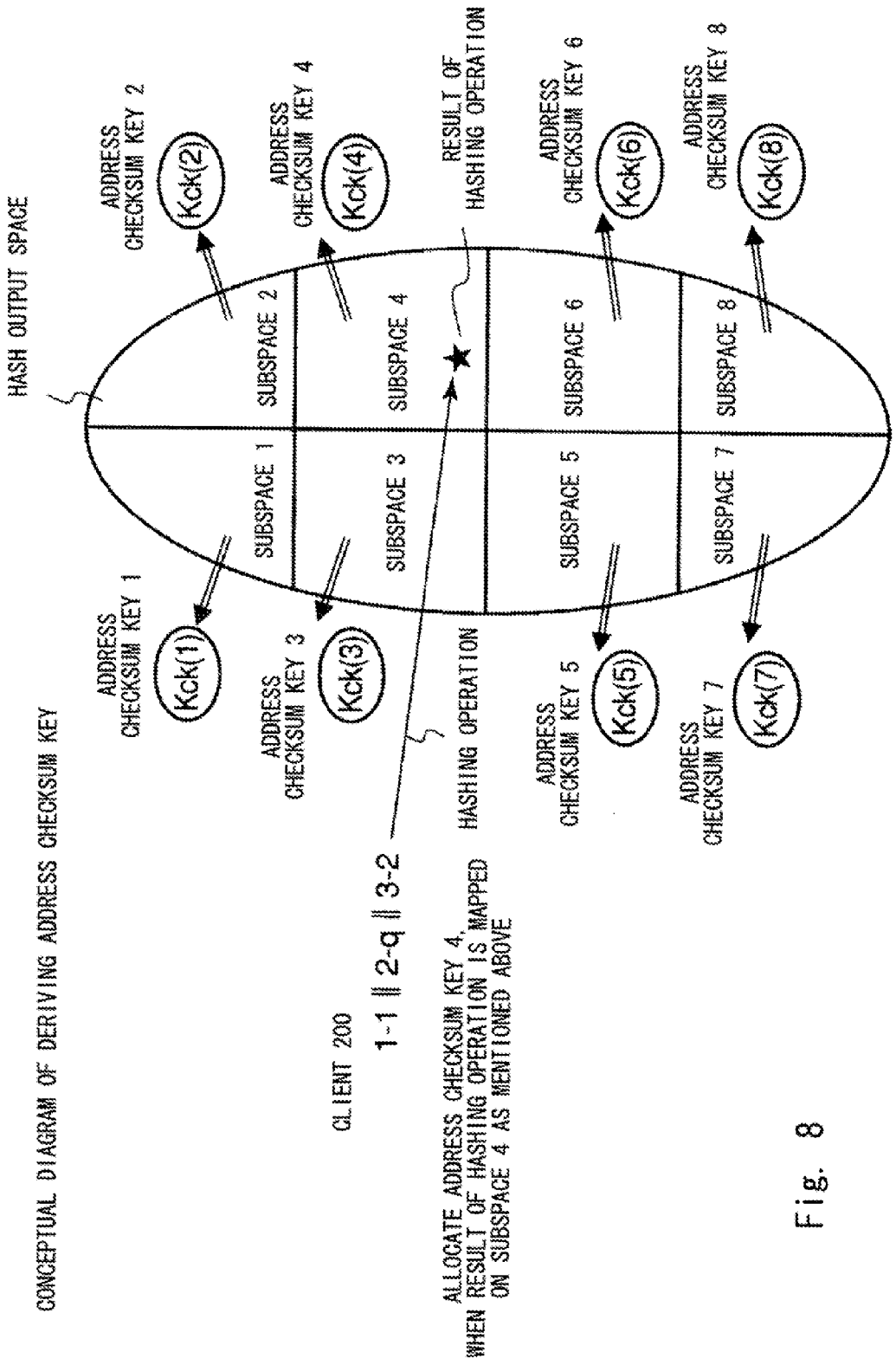
FIG. 8 is an explanatory diagram showing an example of deriving an address checksum key.

FIG. 8 is an explanatory diagram showing an example of deriving the address checksum key. Note that in the example shown in FIG. 8, the bit space of the operation result by the hashing operation means 1041 is evenly divided by eight for the sake of simplifying the description (division number can be arbitrarily determined). Then, address checksum keys 1 (Kck(1)) to 8 (Kck(8)) are associated with the respective divided subspaces.

For example, in a case of the client 200 having the identifier shown in FIG. 3, assume that a hash for a concatenation of data which each indicate the address on each address space configuring the identifier of the client 200 can be mapped on the subspace 4. In this case, the address checksum key allocation means 104 allocates the address checksum key 4 (Kck(4)) to the client 200, on the basis that the hash can be mapped on the subspace 4.

Note that the hashing operation means 1041 can perform the hashing operation by using the well-known method such as SHA1, SHA256, SHA512, or MD5.

The address key storage means 102 in the server 100 is specifically implemented by the storage device such as the magnetic disk device or the optical disk device. The address key storage means 102 secretly stores the address keys allocated to the addresses on the address spaces configuring the identifiers of all of the clients 200, without disclosing the address keys to others. Note that for example, the address key storage means 102 stores the address keys in association with the respective addresses on the address spaces.

Note that in this exemplary embodiment, the address key storage means 102 securely manages the internally stored address keys by using the device against tampering, and prevents the address keys from being illegally used by using the well-known technology of, e.g., restricting access to information by the authentication means such as the password which only the legitimate administrator of the server knows.

The address checksum key storage means 105 in the server 100 is specifically implemented by the storage device such as the magnetic disk device or the optical disk device. The address checksum key storage means 105 secretly stores all of the address checksum keys allocated by the address checksum key allocation means 104 in the server 100, without disclosing the address checksum keys to others.

Note that in this exemplary embodiment, the address checksum key storage means 105 securely manages the internally stored address checksum keys by using the device against tampering, and prevents the address checksum keys from being illegally used by using the well-known technology of, e.g., restricting access to information by the authentication means such as the password which only the legitimate administrator of the server knows.

The message authentication code generation means 103A in the server 100 is specifically implemented by the CPU and the network interface unit in the information processing device which operates in accordance with the program. The message authentication code generation means 103A includes a function of calculating message authentication codes for an arbitrary message, by using the address keys stored by the address key storage means 102 and the address checksum key stored by the address checksum key storage means 105.

The address key storage means 202 in each of the clients 200 is specifically implemented by the storage unit such as the memory or the magnetic disk device included in the sensor device. The address key storage means 202 secretly stores the address keys allocated by the address key allocation means 101 in the server 100, without disclosing the address keys to others.

Note that in this exemplary embodiment, the address key storage means 202 securely manages the internally stored address keys by using the device against tampering, and prevents the address keys from being illegally used by using the well-known technology of, e.g., restricting access to information by the authentication means such as the password which only the legitimate administrator of the client knows.

The address checksum key storage means 203 in each of the clients 200 is specifically implemented by the storage unit such as the memory or the magnetic disk device which is included in the sensor device. The address checksum key storage means 203 secretly stores the address checksum key allocated by the address checksum key allocation means 104 in the server 100, without disclosing the address checksum key to others.

Note that in this exemplary embodiment, the address checksum key storage means 203 securely manages the internally stored address checksum key by using the device against tampering, and prevents the address checksum key from being illegally used by using the well-known technology of, e.g., restricting access to information by the authentication means such as the password which only the legitimate administrator of the client knows.

The message authentication code verification means 201A in each of the clients 200 is specifically implemented by the controller and the communicator included in the sensor device. The message authentication code verification means 201A includes a function of verifying the message authentication codes transmitted from the server 100 through the network 300, by using the address keys stored by the address key storage means 202 and the address checksum key stored by the address checksum key storage means 203.

Figure 9:
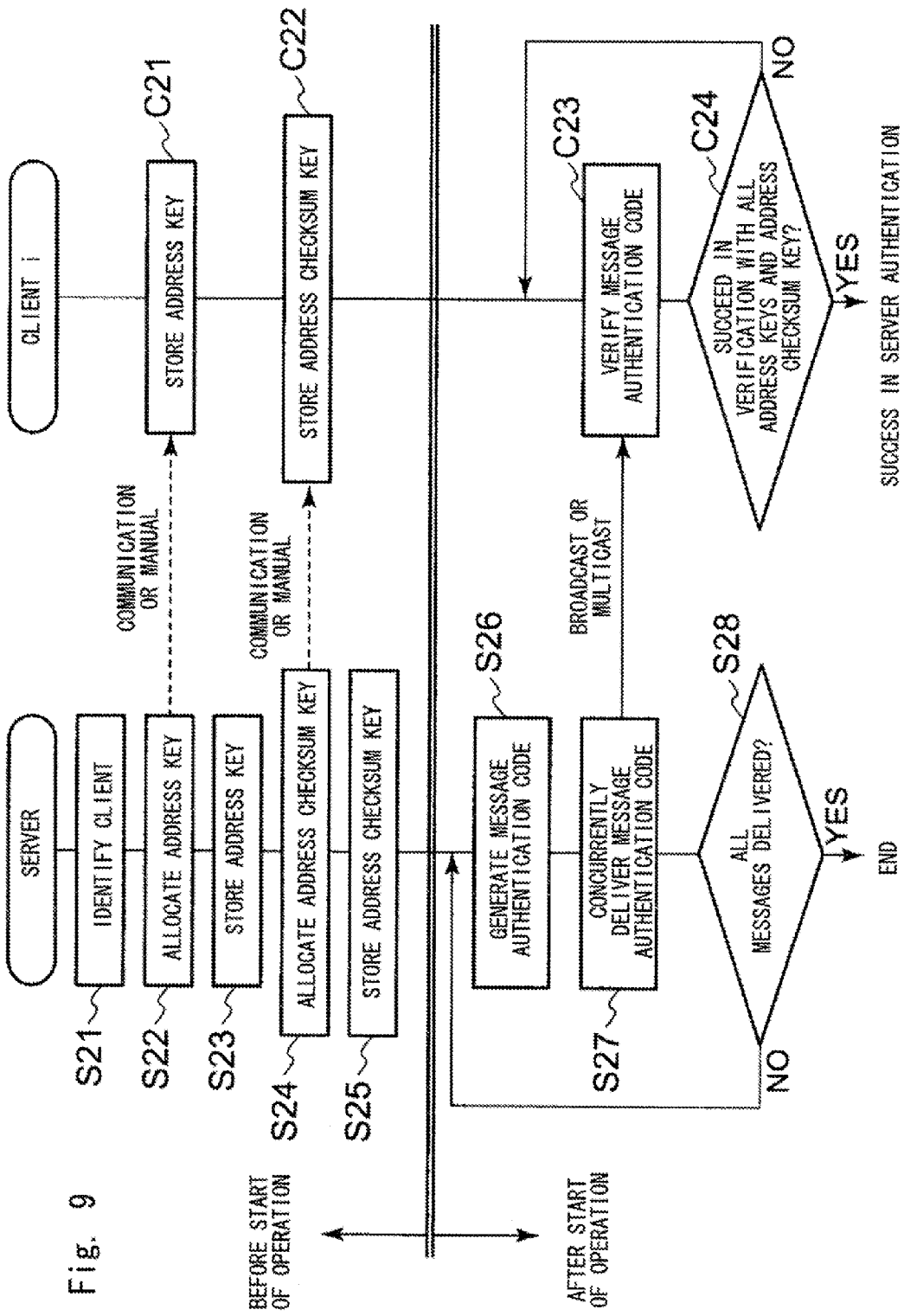
FIG. 9 is a flowchart showing another example of a process where a client authenticates that a server is legitimate.

Next, operation will be described. FIG. 9 is a flowchart showing another example of the process in which each of the clients 200 authenticates that the server 100 is legitimate. Firstly, operation before starting the operation of the server authentication system is described.

Firstly, the server 100 uniquely identifies each of "N" units of clients 200 by a combination of addresses on a plurality of address spaces, at a step prior to authentication of each of the clients 200 (in other words, before starting the operation of the system) (Step S21 shown in FIG. 9).

Next, the server 100 associates unique address keys with the addresses on the address spaces which configure the identifier of each of the clients 200. Then, the server 100 allocates the same address key to a group of clients 200 of which addresses coincide with respect to each address space of the identifier, by using a secure method (Step S22). In this case, as the method of allocating the address keys to each of the clients 200, for example, the address keys may be transmitted online through the existing secure communication path to which the SSL, the IPsec, or the like is applied. Alternatively, for example, the well-known means for which the legitimate administrator inputs the address keys obtained by the legitimate offline way to each of the clients 200 through the input means such as the keyboard may be used.

Next, a client "i" (1≤i≤N), to which the address keys have been allocated by the server 100, stores the allocated address keys (Step C21). Further, the server 100 stores all of the address keys allocated to the clients 200 (Step S23).

Further, the server 100 divides the bit space of the result of the hashing operation into the subspaces, and associates the unique secret information (specifically, the address checksum key) with each subspace. After associating the secret information, the server 100 allocates the same address checksum key by using a secure method to a group of clients 200 which share the subspace including the hash to the concatenation of the data each that indicates the address on each address space configuring the identifier of each of the clients 200 in common (Step S24). In this case, as the method of allocating the address checksum key to each of the clients 200, for example, the address checksum key may be transmitted online through the existing secure communication path to which the SSL, the IPsec, or the like is applied. Alternatively, for example, the well-known means for which the legitimate administrator inputs the address checksum key obtained by the legitimate offline way to each of the clients 200 through the input means such as the keyboard may be used.

Next, the client "i", to which the address checksum key has been allocated by the server 100, stores the allocated address checksum key (Step C22). Further, the server 100 stores all of the address checksum keys allocated to the clients 200 (Step S25).

The processes at the above-mentioned steps are executed, thereby making it possible for each of the clients 200 to authenticate the server 100. In other words, it becomes possible to start the operation of the system.

After starting the operation of the system, there is arisen a situation that "N" units of clients 200 concurrently desire to authenticate that a transmission source of a message is the legitimate server 100, e.g., in a case where the server 100 concurrently delivers the message to "N" units of clients 200. In this case, the server 100 generates message authentication codes for the message to be concurrently delivered. Then, the server 100 concurrently delivers the generated message authentication codes together with the message.

Specifically, the server 100 generates message authentication codes for a group of clients of which addresses coincide with respect to each address space in the identifier of each of the clients 200, by using the address keys corresponding to the addresses. Further, the server 100 generates a message authentication code for a group of clients which share the subspace including the hash to the concatenation of the data that each indicate the address on each address space configuring the identifier of each of the clients 200 in common, by using the address checksum key associated with the common subspace (Step S26). Then, the server 100 concurrently delivers these generated message authentication codes to the groups of clients (Step S27). In this case, as the method of concurrently delivering the message authentication code, the server 100 can use the method by use of multicast or broadcast.

The server 100 generates message authentication codes by using all of the address keys stored by the address key storage means 102 and one address checksum key stored by the address checksum key storage means 105, and repeatedly executes the processes at the steps S26 and S27 until completing concurrent deliveries of the message authentication codes (Step S28).

Specifically, in the example shown in FIG. 2, the server 100 concurrently delivers to the group of clients 200, which have the address a-b (1≤b≤the number ("p", "q", or "r") of addresses on the address space "a") on the address space "a" (1≤a≤3), the message authentication code generated by using the address key K(a-b).

Further, in the example shown in the conceptual diagram of deriving the address checksum key in FIG. 8, when the hash to the concatenation of the data which each indicate the address on each address space configuring the identifier of the client 200 can be mapped on the "c"-th subspace (1≤c≤8), the server 100 concurrently delivers a message authentication code generated by using the address checksum key Kck(c) associated with the "c"-th subspace.

For example, the client 200, which has the identifier shown in FIG. 3, belongs to three groups of the group of clients 200 which have the address 1-1, the group of clients 200 which have the address 2-q, and the group of clients 200 which have the address 3-2. Further, as shown in FIG. 8, the hash to the concatenation of the data which each indicate the address on each address space configuring the identifier of the client 200 can be mapped on the subspace 4. Therefore, as a result, the client 200 receives message authentication codes represented in an expression (4) (and an arbitrary message req_cm).

MAC(K(1-1), req_cmd)

MAC(K(2-q), req_cmd)

MAC(K(3-2), req_cmd)

MAC(Kck(4), req_cmd)                                   (4)

Next, the client "i", which has received the message authentication codes, verifies the message authentication codes by using the address keys or the address checksum key stored by the client itself (in other words, the address keys stored by the address key storage means 202 or the address checksum key stored by the address checksum key storage means 203) (Step C23). Then, the client 200 determines that the server 100 is legitimate, and completes the authentication, when the client 200 determines that the message authentication codes from the server 100 can be correctly verified by exhaustively using all of the allocated address keys and address checksum key (Step C24).

In the examples shown in FIGS. 5 and 8, the address keys and the address checksum key held by the client 200 are respectively K(1-1), K(2-q), K(3-2), and Kck(4). Accordingly, the client 200 can verify all of the message authentication codes which are received from the server 100 and represented in the expression (4) by using these four keys, and determines that it succeeds in authenticating the server 100 on the basis that all of the message authentication codes have been verified. Note that the client 200 determines that it fails in authenticating the server 100, when the message authentication codes have not been verified by any one of the plurality of allocated keys.

For example, in a case where a client XXX which has illegally obtained the address keys of the client 200 exists, "masquerade" that the client XXX masquerades as the server 100 by combining the address keys held by the client itself for a different client 200 of which address keys coincide with the combined address keys may become possible, only when the message authentication codes based on the address keys are used. By contrast, in this exemplary embodiment, there is only one in the division number of hashing operation spaces that the address checksum key which can be known by the illegal client XXX coincides with the address checksum key of the different client 200.

Figure 10:
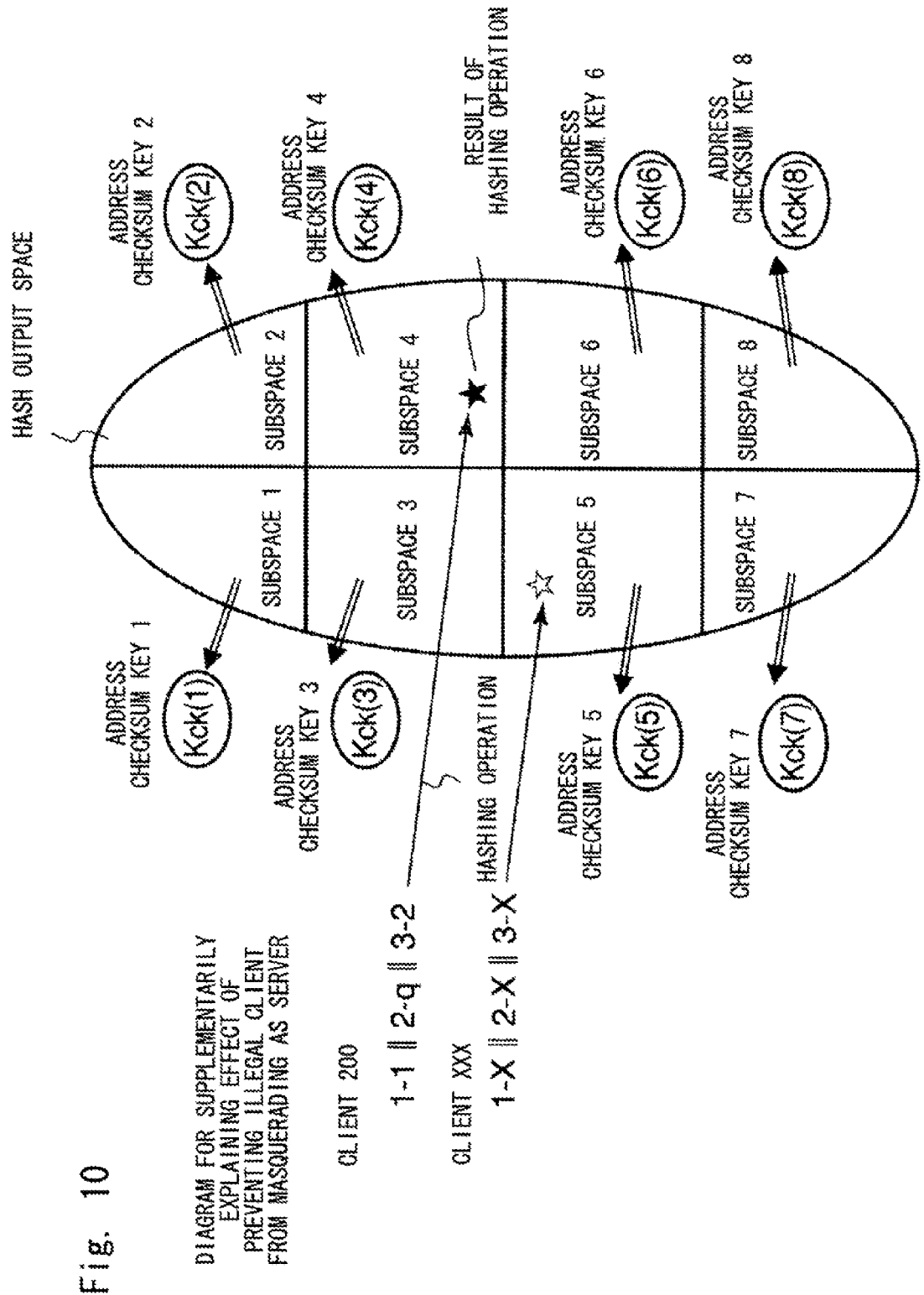
FIG. 10 is an explanatory diagram for explaining, an effect of preventing an illegal client from masquerading as a server.

Specifically, as shown in FIG. 10, in a case of the client XXX indicated by an identifier (1-X, 2-X, 3-X), a hash to a concatenation of data which each indicate the address on each address space configuring the identifier is mapped on the subspace 5. Meanwhile, in the case of the client 200, the hash to the concatenation of the data which each indicate the address on each address space configuring the identifier is mapped on the subspace 4. In this case, the address checksum key of the clients XXX does not coincide with that of the client 200.

Namely, in the example shown in FIG. 10, the client XXX does not know the address checksum key Kck(4), and thus cannot masquerade as the legitimate server 100 for clients which have the address checksum key Kck(4) like the client 200.

As described above, in this exemplary embodiment, even when the client XXX illegally obtains another's address keys, it is possible to reduce the probability that the client XXX can masquerade as the server 100 for a specific client 200 to one in the division number of hashing operation spaces.

As described above, according to this exemplary embodiment, it is determined whether or not the combination of the address keys is legitimate by using the address checksum key. As configured in this way, in addition to the effect described in the first exemplary embodiment, it is possible to reduce the threat of masquerading as the server 100 even when the address keys to be secretly managed by each of the clients 200 are unexpectedly leaked.

Mode for the Invention

Next, the operation of the server authentication system will be described by using a specific mode for the invention. In this mode, operation is described, in a case where read information of meters for electricity, water, gas, or the like is concurrently collected from remote places by using a means such as a network in the sensor network. Such a remote reading is performed, so that anyone does not need to collect the read information while traveling around every single place. Therefore, it is possible to improve the operational efficiency by concurrently collecting the information from the remote places through the network. Note that the server authentication system described in this mode corresponds to that described in the first exemplary embodiment.

Figure 11:
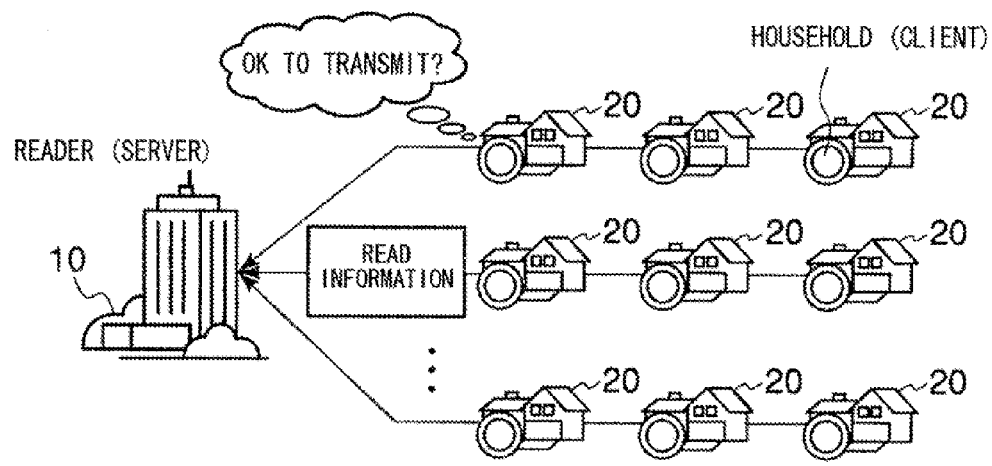
FIG. 11 is an explanatory diagram showing a specific example of an environment to which a server authentication system according to a mode for the invention is applied.

FIG. 11 is an explanatory diagram showing a specific example of an environment to which the server authentication system is applied. In this mode, as shown in FIG. 11, a case is described where read information from a plurality of households 20 is collected to a reader such as an operator 10. In this mode, an example is indicated in FIG. 11 where a read device reading the read information is provided in each of the households 20, and the read information is collected to the reader through the network. Note that specifically, the client 200 which is implemented by the sensor device mounting thereon the various sensors is provided in each of the households 20, and the server 100 which is implemented by the information processing device such as the personal computer is provided on the reader side such as the operator 10.

In the example shown in FIG. 11, the read information transmitted from each of the households 20 includes privacy information in each of the households 20, and thus is not desirable to be leaked to anyone other than the legitimate server 100. Accordingly, a group of clients 200 needs to authenticate that the server is the legitimate server 100 at a step where the server 100 requires the read information of the clients 200 in all of the households 200, and then to transmit the read information.

In this mode, as an example, an appearance is described where a process to authenticate the server just before the transmission of the read information by each of clients 200 which are provided in households 20 at a municipal level (for example, about thirty thousand households) can be implemented with little traffic. Note that the scale of the server authentication system being applied is not limited to that described in this mode. For example, the server authentication system may be applied to a sensor network which includes clients 200 in forty thousand households or more.

Figure 12:
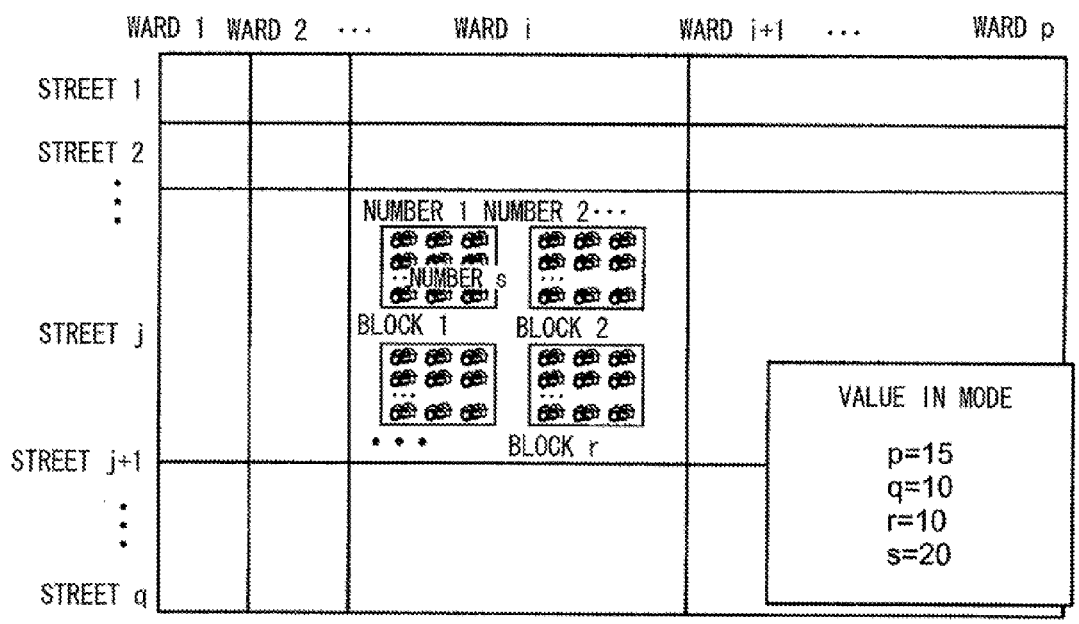
FIG. 12 is an explanatory diagram showing address space configuration in an identifier of a client according to the mode for the invention.

FIG. 12 shows an appearance where each of the clients 200 is uniquely specified in four address spaces (street, ward, number, and block). In other words, in this mode, as an example, a case is described where positions of the clients 200 are specified by using address spaces corresponding to the ward, street, number, and block, based on addresses of the households 20 in which the clients 200 are provided. This means that the client 200 can be identified by combining addresses on the four address spaces.

Further, in this mode, as shown in FIG. 12, assume that the address space corresponding to the ward includes "p"=15 units of addresses, the address space corresponding to the street includes "q"=10 units of addresses, the address space corresponding to the block includes "r"=10 units of addresses, and the address space corresponding to the number includes "s"=20 units of addresses. Accordingly, in this mode, assume that p*q*r*s=30000 units of clients 200 are included in the sensor network to which the server authentication system applied.

Figure 13:
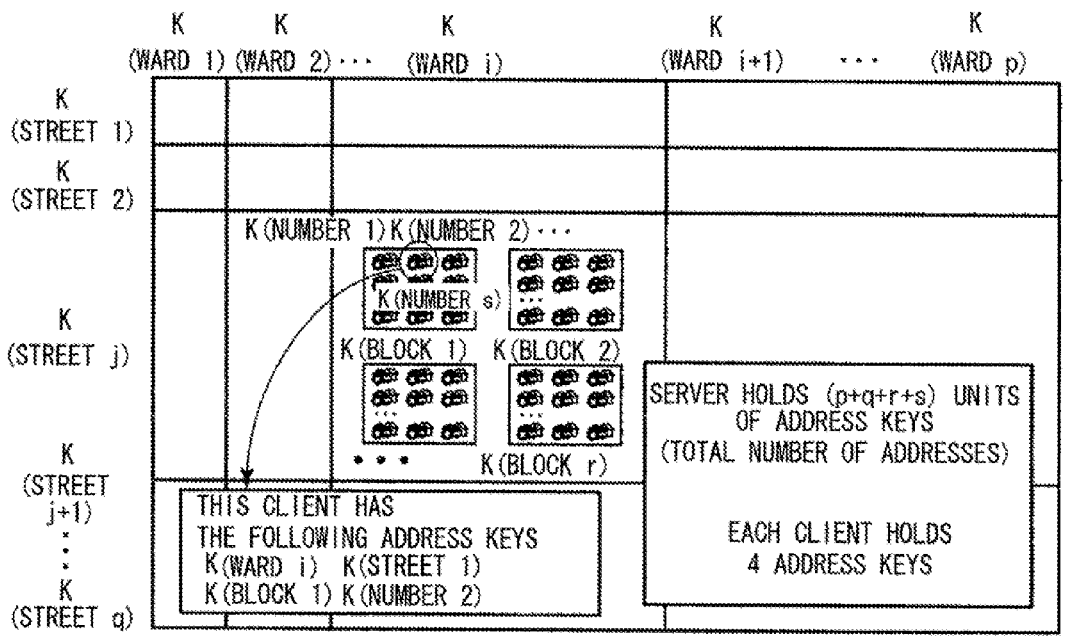
FIG. 13 is an explanatory diagram showing address keys according to the mode for the invention.

In this mode, as shown in FIG. 13, the address key allocation means 101 in the server 100 allocates to each address "adr" secret information (address key) K(adr). For example, the address key allocation means 101 in the server 100 allocates a total of four address keys K(ward i), K(street j), K(block 1), and K(number 2) to a client circled in FIG. 13, and makes the client hold the address keys. In this case, each of the clients 200 stores the four address keys allocated by the server 100 in the address key storage means 202.

Further, the server 100 holds address keys corresponding to the total number of address allocated to all of the clients 200 which are included in the server authentication system. Specifically, the server 100 stores the address keys allocated to the all of the clients 200 in the address key storage means 102.

The above-mentioned processes are executed, so that the client 200 in each of the households 20 can authenticate the server provided on the operator 10 side, and thus the operation of the system can be started.

In a case where the read information is collected after making each of the clients 200 hold the address keys, the server 100 requires information transmission of all of the clients 200. In this case, operation in a case where all of the clients 200 authenticate the server 100 is described as follows.

Firstly, the server 100 concurrently delivers a transmission request req_cmd for the read information to all of the clients 200. In this case, the message authentication code generation means 103 in the server 100 generates message authentication codes based on the address keys stored by the address key storage means 102, and concurrently delivers the generated message authentication codes.

Figure 14:
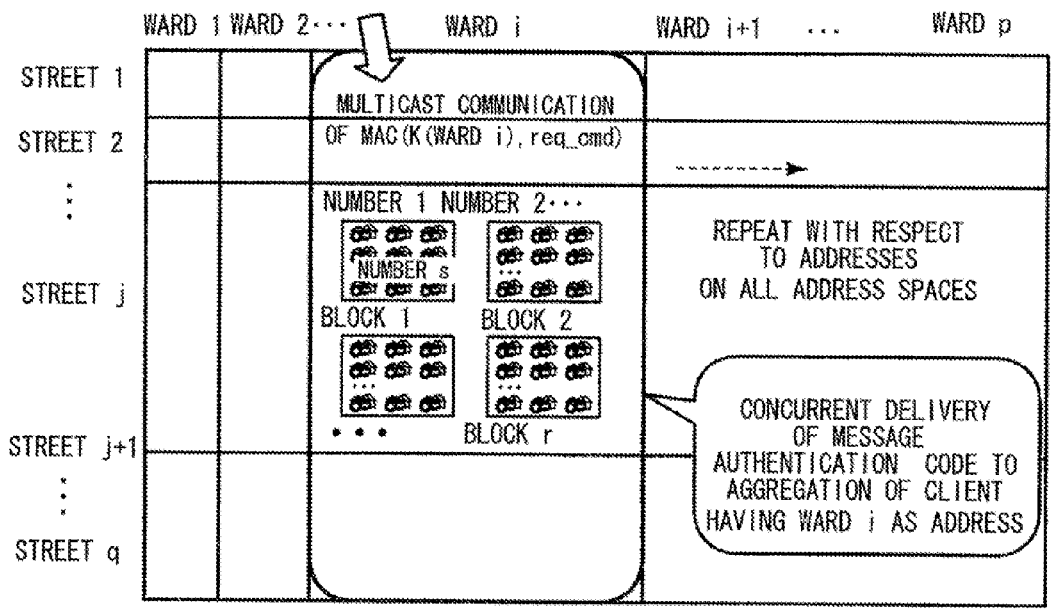
FIG. 14 is an explanatory diagram for explaining a concurrent delivery of message authentication codes according to the mode for the invention.

Specifically, as shown in FIG. 14, the message authentication code generation means 103 in the server 100 generates message authentication codes for a group of clients which share the addresses with respect to all of the address spaces, by using address keys shared by the group of clients. Then, the message authentication code generation means 103 in the server 100 concurrently delivers the generated message authentication codes to the group of clients by using a means such as multicast.

Only the client 200 itself and the server 100 can generate all of the message authentication codes corresponding to all of the addresses held by each of the clients 200, considering the manner of providing the address keys. Therefore, each of the clients 200 can confirm that the request is an authentication request from the legitimate server 100, on condition that all of message authentication codes capable of being generated by using the address keys held by the client itself among the message authentication codes concurrently delivered have been verified.

For example, in the case of the client 200 circled in FIG. 13, the client 200 can authenticate that the request is the transmission request from the legitimate server 100, upon receiving all of message authentication codes represented in an expression (5) (and the message req_cmd indicating the transmission request).

$$MAC(K(\text{ward } i), \text{req\_cmd})$$

$$MAC(K(\text{street } j), \text{req\_cmd})$$

$$MAC(K(\text{block } 1), \text{req\_cmd})$$

$$MAC(K(\text{number } 2), \text{req\_cmd}) \quad (5)$$

In this mode, the server 100 generates the message authentication code for each address and concurrently delivers the message authentication code, so that the number of message authentication codes transmitted from the server 100 into the sensor network equals to the number of all addresses p+q+r+s=15−10+10+20=55. Further, the sizes of the message authentication codes transmitted from the server 100 into the sensor network are represented as an expression (6), if the size of the message authentication code is defined as |MAC|.

$$(15+10+10+20)*|MAC| \quad (6)$$

By contrast, in the case of using the method of generating and unicasting the message authentication code for each client 200, the number of message authentication codes transmitted from the server 100 into the sensor network equals to p*q*r*s=15*10*10*20=30000 which is equivalent to the number of all clients 200 in the sensor network. Further, the sizes of the message authentication codes transmitted from the server 100 into the sensor network are represented as an expression (7).

$$(15*10*10*20)*|MAC| \quad (7)$$

As described above, in this mode, it is possible to reduce the number of message authentication codes to be generated by the server 100 to 55/30000~1/545, compared to that by the method of generating the message authentication code for each client 200. Further, the processes to authenticate the server 100 by the clients 200 which are provided in the households 20 at the municipal level (about thirty thousand households) upon transmitting the read information can be achieved with the traffic of about 1/545.

Figure 15:
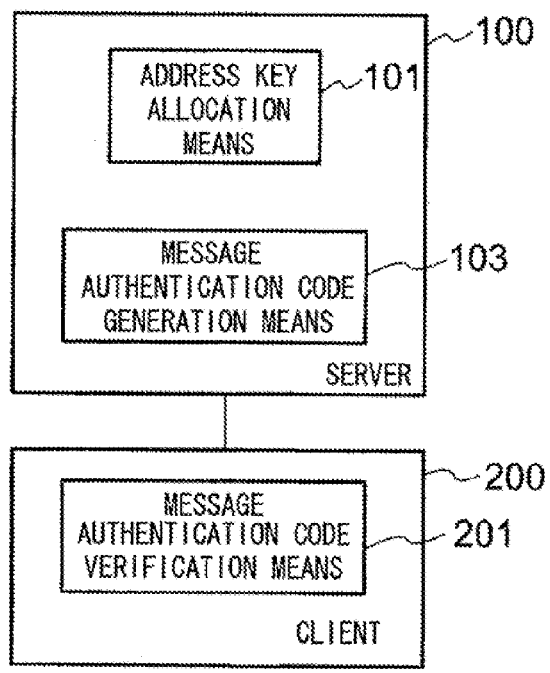
FIG. 15 is a configuration diagram showing an example of minimum configuration of a server authentication system.
Figure 16:
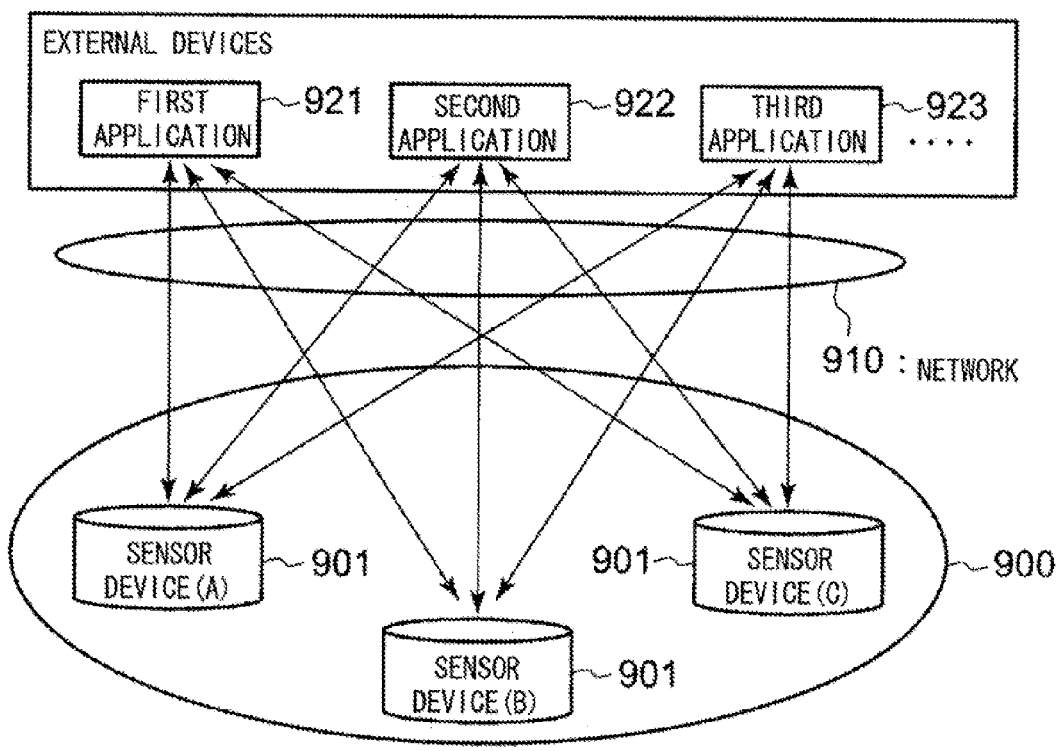
FIG. 16 is an explanatory diagram showing an example of a sensor network.

Next, minimum configuration of the server authentication system according to the present invention will be described. FIG. 15 is a block diagram showing an example of the minimum configuration of the server authentication system. As shown in FIG. 15, the server authentication system is the one in which the client 200 authenticates the server 100. The server 100 includes the address key allocation means 101 and the message authentication code generation means 103, as the minimum constituent elements. Further, the client 200 includes the message authentication code verification means 201 as the minimum constituent element.

In the server authentication system having the minimum configuration shown in FIG. 15, the address key allocation means 101 includes the function of generating the identifier to identify the client 200 by the combination of the addresses on the plurality of address spaces, and allocating the address keys to the respective addresses configuring the generated identifier. Further, the message authentication code generation means 103 includes the function of generating the message authentication codes corresponding to the message, by using the address keys allocated by the address key allocation means 101. Furthermore, the message authentication code verification means 201 includes the function of authenticating the server 100 based on the message authentication codes generated by the message authentication code generation means 103.

According to the server authentication system having the minimum configuration shown in FIG. 15, the server 100 does not generate the message authentication code for each client 200, but generates the message authentication codes for the group of clients 200 which have the same address on each address space in the identifiers of the clients 200. Accordingly, the server 100 does not need to generate a message authentication code for each client 200, so that it is possible to reduce the amount of data transmission and processing time required for the authentication process.

Note that in the above-mentioned exemplary embodiments and mode, the characteristic configuration of the server authentication system has been described as indicated in the following (1) to (9).

(1) A server authentication system is the one in which clients (for example, clients 200) authenticate a server (for example, server 100). The server includes: an address key allocation means (for example, realized by the address key allocation means 101) for generating an identifier to identify each of the clients by a combination of addresses on a plurality of address spaces, and allocating address keys to the respective addresses configuring the generated identifier; and a message authentication code generation means (for example, realized by the message authentication code generation means 103) for generating message authentication codes corresponding to a message by using the address keys allocated by the address key allocation means. Each of the clients includes a server authentication means (for example, realized by the message authentication code verification means 201) for authenticating the server based on the message authentication codes generated by the message authentication code generation means.

(2) In the server authentication system, the address key allocation means may create the plurality of address spaces in order to generate the identifier to identify each of the clients, associate unique address keys with the addresses on the address spaces configuring the identifier to identify each of the clients, under a condition for uniquely identifying each of the clients by a combination of the addresses of each of the clients in the address spaces, and securely allocate to each of the clients all of the address keys associated with the addresses on the address spaces configuring the identifier to identify each of the clients.

(3) In the server authentication system, the server may further include an address key storage means (for example, realized by the address key storage means 102) for secretly storing the address keys allocated by the address key allocation means to the addresses on the address spaces configuring the identifiers to identify all of the clients. The message authentication code generation means may generate the message authentication codes corresponding to the message by using the address keys stored by the address key storage means.

(4) In the server authentication system, each of the clients may further include a client side address key storage means (for example, realized by the address key storage means 202) for secretly storing the address keys allocated by the address key allocation means. The server authentication means may verify the message authentication codes received from the server through a network by using the address keys stored by the client side address key storage means, and thus authenticate the server.

(5) In the server authentication system, the message authentication code generation means may generate the message authentication codes for a group of clients of which addresses coincide with respect to each of the address spaces of the identifier, by using the address keys corresponding to the coincident addresses, and concurrently deliver the generated message authentication codes to the group of clients. The server authentication means may determine that it succeeds in authenticating the server, on condition that it determines that the message authentication codes received from the server are correctly verified by using all of the address keys allocated to its own client.

(6) In the server authentication system, the server may further include an address checksum key allocation means (for example, realized by the address checksum key allocation means 104) for dividing a bit space of a result of a hashing operation into subspaces, associating unique address checksum keys with the subspaces, then hashing a concatenation of data that each indicate the address on each of the address spaces configuring the identifier to identify each of the clients, and securely allocating the address checksum key associated with the subspace including the obtained hash to each of the clients. The message authentication code generation means may generate message authentication codes corresponding to the message, by using the address keys allocated by the address key allocation means and the address checksum key allocated by the address checksum key allocation means.

(7) In the server authentication system, the server may further include: an address key storage means (for example, realized by the address key storage means 102) for secretly storing the address keys allocated by the address key allocation means to the addresses on the address spaces configuring the identifiers to identify all of the clients; and an address checksum key storage means (for example, realized by the address checksum key storage means 105) for secretly storing the address checksum key allocated by the address checksum key allocation means to the subspace including the hash to the concatenation of the data that each indicate the address on each of the address spaces configuring the identifiers to identify all of the clients. The message authentication code generation means may generate the message authentication codes corresponding to the message, by using the address keys stored by the address key storage means and the address checksum key stored by the address checksum key storage means.

(8) In the server authentication system, each of the clients may further include: a client side address key storage means (for example, realized by the address key storage means 202) for secretly storing the address keys allocated by the address key allocation means; and a client side address checksum key storage means (for example, realized by the address checksum key storage means 203) for secretly storing the address checksum key allocated by the address checksum key allocation means. The server authentication means may verify the message authentication codes received from the server through a network, by using the address keys stored by the client side address key storage means and the address checksum key stored by the client side address checksum key storage means, and thus authenticates the server.

(9) In the server authentication system, the message authentication code generation means may generate the message authentication codes for a group of clients of which addresses coincide with respect to each of the address spaces of the identifier, by using the address keys corresponding to the coincident addresses, concurrently deliver the generated message authentication codes to the group of clients, generate the message authentication code by using the address checksum key associated with the subspace including the hash to the concatenation of the data with respect to the address on each of the address spaces configuring the identifier, and concurrently deliver the generated message authentication code to a group of clients which share the subspace including the hash to the concatenation of the data with respect to the address on each of the address spaces configuring the identifier in common. The server authentication means may determine that it succeeds in authenticating the server, on condition that it determines that the message authentication codes received from the server are correctly verified by using all of the address keys and the address checksum key allocated to its own client.

INDUSTRIAL APPLICABILITY

The present invention is applicable to a sensor network in which read information of such as heart rate meters, thermometers, electric meters or gas meters is collected. Further, the present invention is applicable to use for authenticating a server which is a transmission source of firmware or a program, upon remotely and concurrently updating the firmware or the program embedded in each of clients.

The invention claimed is

1. A server authentication system in which clients authenticate a server, wherein the server comprises:
    an address key allocation unit that generates an identifier to identify each of the clients by a combination of addresses on a plurality of address spaces, and allocates, in a one-to-one manner, address keys to the respective addresses configuring the generated identifier; and
    a message authentication code generation unit that generates message authentication codes corresponding to a message by using the address keys allocated by the address key allocation unit, the message authentication codes generated for each of the clients being in a one-to-one relationship to the address keys allocated for each of the clients, and
    each of the clients comprises a server authentication unit that authenticates the server based on the message authentication codes generated by the message authentication code generation unit,
    wherein a part of the addresses configuring the identifier generated for each of the clients configures a portion of an identifier generated for at least one different client among the clients, the address keys allocated for each of the clients are not correlated with each other and thus a part of the address keys allocated for each of the clients is in common with a part of the address keys allocated for at least one different client among the clients, so that a number of the allocated address keys is smaller than a number of the clients, and
    wherein a part of the message authentication codes generated for each of the clients is in common with a part of the message authentication codes generated for at least one different client among the clients, because the part of the address keys allocated for each of the clients is in common with the part of address keys allocated for at least one different client among the clients.

2. The server authentication system according to claim 1, wherein the address key allocation unit creates the plurality of address spaces in order to generate the identifier to identify each of the clients, associates unique address keys with the addresses on the address spaces configuring the identifier to identify each of the clients, under a condition for uniquely identifying each of the clients by a combination of the addresses of each of the clients in the address spaces, and securely allocates to each of the clients all of the address keys associated with the addresses on the address spaces configuring the identifier to identify each of the clients.

3. The server authentication system according to claim 1, wherein
    the server further comprises an address key storage unit that secretly stores the address keys allocated by the address key allocation unit to the addresses on the address spaces configuring the identifiers to identify all of the clients,
    wherein the message authentication code generation unit generates the message authentication codes corresponding to the message by using the address keys stored by the address key storage unit.

4. The server authentication system according to claim 1, wherein
    each of the clients further comprises a client side address key storage unit that secretly stores the address keys allocated by the address key allocation unit,
    wherein the server authentication unit verifies the message authentication codes received from the server through a network by using the address keys stored by the client side address key storage unit, and thus authenticates the server.

5. The server authentication system according to claim 1, wherein
    the message authentication code generation unit generates the message authentication codes for a group of clients of which addresses coincide with respect to each of the address spaces of the identifier, by using the address keys corresponding to the coincident addresses, and concurrently delivers the generated message authentication codes to the group of clients, and
    the server authentication unit determines that it succeeds in authenticating the server, on condition that it determines that the message authentication codes received from the server are correctly verified by using all of the address keys allocated to its own client.

6. The server authentication system according to claim 1, wherein the server further comprises an address checksum key allocation unit that divides a bit space of a result of a hashing operation into subspaces, associates unique address checksum keys with the subspaces, then hashes a concatenation of data that each indicate the address on each of the address spaces configuring the identifier to identify each of the clients, and securely allocates the address checksum key associated with the subspace including the obtained hash to each of the clients,
    wherein the message authentication code generation unit generates message authentication codes corresponding to the message, by using the address keys allocated by the address key allocation unit and the address checksum key allocated by the address checksum key allocation unit.

7. The server authentication system according to claim 6, wherein
the server further comprises:
an address key storage unit that secretly stores the address keys allocated by the address key allocation unit to the addresses on the address spaces configuring the identifiers to identify all of the clients; and
an address checksum key storage unit that secretly stores the address checksum key allocated by the address checksum key allocation unit to the subspace including the hash to the concatenation of the data that each indicate the address on each of the address spaces configuring the identifiers to identify all of the clients,
wherein the message authentication code generation unit generates the message authentication codes corresponding to the message, by using the address keys stored by the address key storage unit and the address checksum key stored by the address checksum key storage unit.

8. The server authentication system according to claim 6, wherein
each of the clients further comprises:
a client side address key storage unit that secretly stores the address keys allocated by the address key allocation unit; and
a client side address checksum key storage unit that secretly stores the address checksum key allocated by the address checksum key allocation unit,
wherein the server authentication unit verifies the message authentication codes received from the server through a network, by using the address keys stored by the client side address key storage unit and the address checksum key stored by the client side address checksum key storage unit, and thus authenticates the server.

9. The server authentication system according to claim 6, wherein the message authentication code generation unit generates the message authentication codes for a group of clients of which addresses coincide with respect to each of the address spaces of the identifier, by using the address keys corresponding to the coincident addresses, concurrently delivers the generated message authentication codes to the group of clients, generates the message authentication code by using the address checksum key associated with the subspace including the hash to the concatenation of the data with respect to the address on each of the address spaces configuring the identifier, and concurrently delivers the generated message authentication code to a group of clients which share the subspace including the hash to the concatenation of the data with respect to the address on each of the address spaces configuring the identifier in common, and
the server authentication unit determines that it succeeds in authenticating the server, on condition that it determines that the message authentication codes received from the server are correctly verified by using all of the address keys and the address checksum key allocated to its own client.

10. A server included in a server authentication system in which clients authenticate the server, comprising:
an address key allocation unit that generates an identifier to identify each of the clients by a combination of addresses on a plurality of address spaces, and allocates, in a one-to-one manner, address keys to the respective addresses configuring the generated identifier; and
a message authentication code generation unit that generates message authentication codes corresponding to a message by using the address keys allocated by the address key allocation unit, the message authentication codes generated for each of the clients being in a one-to-one relationship to the address keys allocated for each of the clients,
wherein a part of the addresses configuring the identifier generated for each of the clients configures a portion of an identifier generated for at least one different client among the clients, the address keys allocated for each of the clients are not correlated with each other and thus a part of the address keys allocated for each of the clients is in common with a part of the address keys allocated for at least one different client among the clients, so that a number of the allocated address keys is smaller than a number of the clients, and
wherein a part of the message authentication codes generated for each of the clients is in common with a part of the message authentication codes generated for at least one different client among the clients, because the part of the address keys allocated for each of the clients is in common with the part of address keys allocated for at least one different client among the clients.

11. The server according to claim 10, wherein the address key allocation unit creates the plurality of address spaces in order to generate the identifier to identify each of the clients, associates unique address keys with the addresses on the address spaces configuring the identifier to identify each of the clients, under a condition for uniquely identifying each of the clients by a combination of the addresses of each of the clients in the address spaces, and securely allocates to each of the clients all of the address keys associated with the addresses on the address spaces configuring the identifier to identify each of the clients.

12. A client included in a server authentication system in which the client authenticates a server, comprising:
a server authentication unit that authenticates the server based on message authentication codes generated by the server,
wherein the server comprises an address key allocation unit that generates an identifier to identify the client by a combination of addresses on a plurality of address spaces and allocates, in a one-to-one manner, address keys to the respective addresses configuring the generated identifier, and a message authentication code generation unit that generates the message authentication codes corresponding to a message by using the address keys allocated by the address key allocation unit, the message authentication codes being in a one-to-one relationship to the address keys,
wherein a part of the addresses configuring the identifier generated for the client configures a portion of an identifier generated for at least one different client among clients included in the server authentication system, the address keys allocated for each of the clients are not correlated with each other and thus a part of the address keys allocated for each of the clients is in common with a part of the address keys allocated for at least one different client among the clients, so that a number of the address keys allocated for the clients is smaller than a number of the clients, and
wherein a part of the message authentication codes generated for the client is in common with a part of message authentication codes generated for at least one different client among the clients, because the part of the address keys allocated for each of the clients is in common with the part of address keys allocated for at least one different client among the clients.

13. A server authentication method of authenticating a server by clients, comprising:

generating, by the server, an identifier to identify each of the clients by a combination of addresses on a plurality of address spaces, and allocating, in a one-to-one manner, address keys to the respective addresses configuring the generated identifier;

generating, by the server, message authentication codes corresponding to a message by using the allocated address keys, the message authentication codes generated for each of the clients being in a one-to-one relationship to the address keys allocated for each of the clients; and authenticating, by each of the clients, the server based on the message authentication codes generated by the server, wherein a part of the addresses configuring the identifier generated for each of the clients configures a portion of an identifier generated for at least one different client among the clients, the address keys allocated for each of the clients are not correlated with each other and thus a part of the address keys allocated for each of the clients is in common with a part of the address keys allocated for at least one different client among the clients, so that a number of the allocated address keys is smaller than a number of the clients, and wherein a part of the message authentication codes generated for each of the clients is in common with a part of the message authentication codes generated for at least one different client among the clients, because the part of the address keys allocated for each of the clients is in common with the part of address keys allocated for at least one different client among the clients.

14. The server authentication method according to claim 13, wherein upon the allocation of the address keys, the server creates the plurality of address spaces in order to generate the identifier to identify each of the clients, associates unique address keys with the addresses on the address spaces configuring the identifier to identify each of the clients, under a condition for uniquely identifying each of the clients by a combination of the addresses of each of the clients in the address spaces, and securely allocates to each of the clients all of the address keys associated with the addresses on the address spaces configuring the identifier to identify each of the clients.

15. A non-transitory computer readable medium that stores a program for server authentication in which clients authenticate a server, wherein the program causes a computer to execute:

an address key allocation process to generate an identifier to identify each of the clients by a combination of addresses on a plurality of address spaces, and allocate, in a one-to-one manner, address keys to the respective addresses configuring the generated identifier; and a message authentication code generation process to generate message authentication codes corresponding to a message by using the allocated address keys, the message authentication codes generated for each of the clients being in a one-to-one relationship to the address keys allocated for each of the clients, wherein a part of the addresses configuring the identifier generated for each of the clients configures a portion of an identifier generated for at least one different client among the clients, the address keys allocated for each of the clients are not correlated with each other and thus a part of the address keys allocated for each of the clients is in common with a part of the address keys allocated for at least one different client among the clients, so that a number of the allocated address keys is smaller than a number of the clients, and wherein a part of the message authentication codes generated for ach of the clients is in common with a part of the message authentication codes generated for at least one different client among the clients, because the part of the address keys allocated for each of the clients is in common with the part of address keys allocated for at least one different client among the clients.

16. The non-transitory computer readable medium according to claim 15, wherein the program causes the computer in the address key allocation process to execute:

a process to create the plurality of address spaces in order to generate the identifier to identify each of the clients, associate unique address keys with the addresses on the address spaces configuring the identifier to identify each of the clients, under a condition for uniquely identifying each of the clients by a combination of the addresses of each of the clients in the address spaces; and a process to securely allocate to each of the clients all of the address keys associated with the addresses on the address spaces configuring the identifier to identify each of the clients.

* * * * *